United States Patent
Na et al.

(10) Patent No.: US 12,219,066 B2
(45) Date of Patent: Feb. 4, 2025

(54) ELECTRONIC DEVICE FOR SHARING ID AND PASSWORD, METHOD FOR OPERATING THEREOF, AND SERVER

(71) Applicant: Samsung Electronics Co., Ltd., Gyeonggi-do (KR)

(72) Inventors: Shinyoung Na, Gyeonggi-do (KR); Nahyeong Park, Gyeonggi-do (KR); Wonseok Baek, Gyeonggi-do (KR); Junsuk Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 17/560,542

(22) Filed: Dec. 23, 2021

(65) Prior Publication Data

US 2022/0209954 A1     Jun. 30, 2022

Related U.S. Application Data

(63) Continuation of application No. PCT/KR2021/019627, filed on Dec. 22, 2021.

(30) Foreign Application Priority Data

Dec. 24, 2020   (KR) .......................... 10-2020-0183250

(51) Int. Cl.
*H04L 9/32*   (2006.01)
*H04L 9/08*   (2006.01)

(52) U.S. Cl.
CPC ............ *H04L 9/3226* (2013.01); *H04L 9/085* (2013.01); *H04L 9/0863* (2013.01)

(58) Field of Classification Search
None
See application file for complete search history.

(56) References Cited

U.S. PATENT DOCUMENTS 9,154,497 B1 * 10/2015 Balzam ................ H04L 63/083
11,658,823 B1 * 5/2023 Reitman ............... H04L 9/3226
                                                      713/168

(Continued)

FOREIGN PATENT DOCUMENTS

CN         107294832 A      10/2017
JP        2006-005909 A      1/2006

(Continued)

OTHER PUBLICATIONS

International Search Report dated Mar. 25, 2022.

(Continued)

*Primary Examiner* — Christopher C Harris
(74) *Attorney, Agent, or Firm* — Cha & Reiter, LLC

(57) ABSTRACT

An electronic device, server and method are disclosed. The electronic device includes a communication module, memory, and a processor. The processor implements one method, including executing authentication and registering of an external electronic device as a sharing target, receiving a selection of at least one service to be shared with the external electronic device, encrypting data including an user identification (ID) and a password associated with the at least one service in response to the selection, transmitting a request for sharing the encrypted data to a server through the communication module to allow the external electronic device to use the at least one service without exposure of the ID and the password, receiving a response to the transmitted request from the server through the communication module, and generating a notification indicating whether the ID and the password are successfully shared for the selected at least one service, based on the received response.

15 Claims, 18 Drawing Sheets

(56) References Cited

U.S. PATENT DOCUMENTS

| | | | |
|---|---|---|---|
| 11,921,839 B2* | 3/2024 | Mondello | H04L 63/061 |
| 2005/0259824 A1 | 11/2005 | Isozaki et al. | |
| 2008/0052777 A1 | 2/2008 | Kawano et al. | |
| 2012/0144199 A1 | 6/2012 | Hamachi | |
| 2013/0115915 A1* | 5/2013 | Tipton | H04L 67/306 |
| | | | 455/411 |
| 2013/0166918 A1* | 6/2013 | Shahbazi | H04L 9/0863 |
| | | | 713/183 |
| 2014/0075523 A1* | 3/2014 | Tuomaala | H04L 63/08 |
| | | | 726/6 |
| 2014/0092813 A1* | 4/2014 | Jaakkola | H04L 51/52 |
| | | | 370/328 |
| 2014/0208112 A1* | 7/2014 | McDonald | G06F 21/34 |
| | | | 713/171 |
| 2015/0085848 A1* | 3/2015 | Reunamaki | H04W 48/08 |
| | | | 370/338 |
| 2015/0172925 A1* | 6/2015 | Leppanen | H04W 12/04 |
| | | | 726/7 |
| 2015/0256336 A1* | 9/2015 | Stiglic | H04L 9/0863 |
| | | | 380/281 |
| 2016/0285633 A1* | 9/2016 | Allinson | H04L 63/0853 |
| 2017/0012990 A1 | 1/2017 | Himberger et al. | |
| 2017/0201380 A1 | 7/2017 | Schaap et al. | |
| 2017/0201550 A1* | 7/2017 | Benson | H04L 63/0815 |
| 2017/0339118 A1 | 11/2017 | Hwang et al. | |
| 2018/0026973 A1* | 1/2018 | Le Saint | G06F 21/35 |
| 2018/0091538 A1* | 3/2018 | Narayanan | H04L 63/1425 |
| 2018/0114010 A1* | 4/2018 | Van Os | G06Q 20/12 |
| 2018/0115423 A1* | 4/2018 | Kölhi | H04W 12/06 |
| 2018/0316658 A1* | 11/2018 | Bartlett | H04W 12/041 |
| 2019/0297027 A1* | 9/2019 | Whalley | H04L 67/02 |
| 2019/0372949 A1* | 12/2019 | Sanciangco | H04W 12/50 |
| 2020/0159965 A1* | 5/2020 | Norem | H04L 9/3268 |
| 2020/0211016 A1* | 7/2020 | Ju | G06Q 40/02 |
| 2021/0243184 A1* | 8/2021 | La Torre | H04L 63/083 |
| 2021/0385224 A1* | 12/2021 | Singh | H04L 63/0853 |
| 2022/0060469 A1* | 2/2022 | Yee | H04L 63/102 |
| 2022/0124078 A1* | 4/2022 | Erickson | H04L 9/0894 |
| 2022/0200988 A1* | 6/2022 | Garg | H04L 63/0236 |
| 2023/0014473 A1* | 1/2023 | Grainger | H04L 9/3268 |

FOREIGN PATENT DOCUMENTS

| | | |
|---|---|---|
| JP | 2008-052704 A | 3/2008 |
| JP | 2010-178388 A | 8/2010 |
| JP | 2012-124665 A | 6/2012 |
| KR | 10-2005-0086106 A | 8/2005 |
| KR | 10-2017-0129549 A | 11/2017 |
| KR | 10-2018-0012129 A | 2/2018 |
| KR | 10-2018-0096699 A | 8/2018 |
| KR | 10-2018-0111010 A | 10/2018 |
| KR | 10-2019-0069361 A | 6/2019 |

OTHER PUBLICATIONS

"Flexible Communication: A Secure and Trust-Based Free Wi-Fi Password Sharing Service" Published Jan. 3, 2012.

"Internet of Things (IoT): A verification framework" Published Mar. 2, 2017.

* cited by examiner

ELECTRONIC DEVICE FOR SHARING ID AND PASSWORD, METHOD FOR OPERATING THEREOF, AND SERVER

CROSS-REFERENCE TO RELATED APPLICATION(S)

This application is a continuation application, claiming priority under § 365(c), of an International application No. PCT/KR2021/019627, filed on Dec. 22, 2021, which was based on and claimed the benefit of an Korean patent application Serial number 10-2020-0183250, filed on Dec. 24, 2020 in the Korean Intellectual Property Office, the disclosures of each of which is incorporated by reference herein in its entirety.

BACKGROUND

1) Field

The disclosure relates to sharing access security, and, more particularly, an electronic device for sharing a user identification (ID) and a corresponding password, a method of operating the same, and a server.

2) Description of Related Art

With the gradual increase in performance of electronic devices such as smart phones, electronic devices have grown increasingly capable of providing a variety of services. As users have become accustomed to accessing a diversity of services from such devices, privacy and security issues have developed, increasing the importance of protecting user data.

For example, when an electronic devices logs into a website or executes an application, a user identification (ID) and/or a password may be requested by the website or the application. Further, when a non-standard user, such as a family member or an acquaintance, wishes to access the website or the application, users often share their ID and password, enabling the non-standard user to access the desired website or application.

However, when a user shares their ID and password; e.g., such as through a text-based messenger, a phone-based communication, shared-memo, etc., there is a danger that the user's sensitive private information will be leaked. Further, in general, users typically cannot remember numerous ID and passwords for a diversity of websites and applications, and as such, the user often utilizes a single ID and password pair for many different services. Accordingly, if the user shares that ID and password pair with a counterpart, the counterpart may gain access to a variety of the user's services and accounts. Furthermore, there is no ability to cancel sharing unless the user changes the password at a future time. Further, when the user shares the ID and password pair through a non-encrypted scheme, such as, for example, a text-based messenger, phone-based communication, a memo, etc., the risk of unintentionally leaking their private information to unspecified individuals may increase.

SUMMARY

Accordingly, a method and electronic device are disclosed herein, which enable sharing of access with a desired counterpart, without exposure of IDs and passwords, via passing through of a user authentication procedure on an electronic device carried by the user.

Certain embodiments of the disclosure may provide an electronic device for sharing IDs and passwords without exposing the same to potential leakage, a method of operating the same, and a server supporting the same.

According to certain embodiments, an electronic device includes a communication module, a memory, and at least one processor operatively connected to the communication module and the memory, wherein the at least one processor is configured to execute authentication and registering of an external electronic device as a sharing target, receive a selection of at least one service to be shared with the external electronic device, encrypt data including an user identification (ID) and a password associated with the at least one service in response to the selection, transmit a request for sharing the encrypted data to a server through the communication module to allow the external electronic device to use the at least one service without exposure of the ID and the password, receive a response to the transmitted request from the server through the communication module, and generate a notification indicating whether the ID and the password are successfully shared for the selected at least one service, based on the received response.

According to certain embodiments, a server includes a communication module, a memory, and at least one processor operatively connected to the communication module and the memory, wherein the at least one processor is configured to execute authentication of an external electronic device and register the authenticated external electronic device as a sharing target, receive encrypted data including a user identification (ID) and a password for at least one service to be shared with the external electronic device from the electronic device, and transmit the encrypted data to the external electronic device to allow the external electronic device to use the service without exposure of the ID and the password in response to the reception of the encrypted data.

According to certain embodiments, a method of sharing an ID and a password by an electronic device includes executing, by at least one processor, authentication of an external electronic device, and registering the authenticated external electronic device sharing target as a sharing target, receiving, by input circuitry, a selection of at least one service to be shared with the external electronic device, encrypting data including a user identification (ID) and a password associated with the at least one service in response to the selection, transmitting a request for sharing the encrypted data to a server through the communication module to allow the external electronic device to use the at least one service without exposure of the ID and the password, receiving a response to the transmitted request from the server through the communication module, and generating a notification indicating whether the ID and the password are successfully shared for the selected at least one service, based on the received response

DETAILED DESCRIPTION

Figure 1:
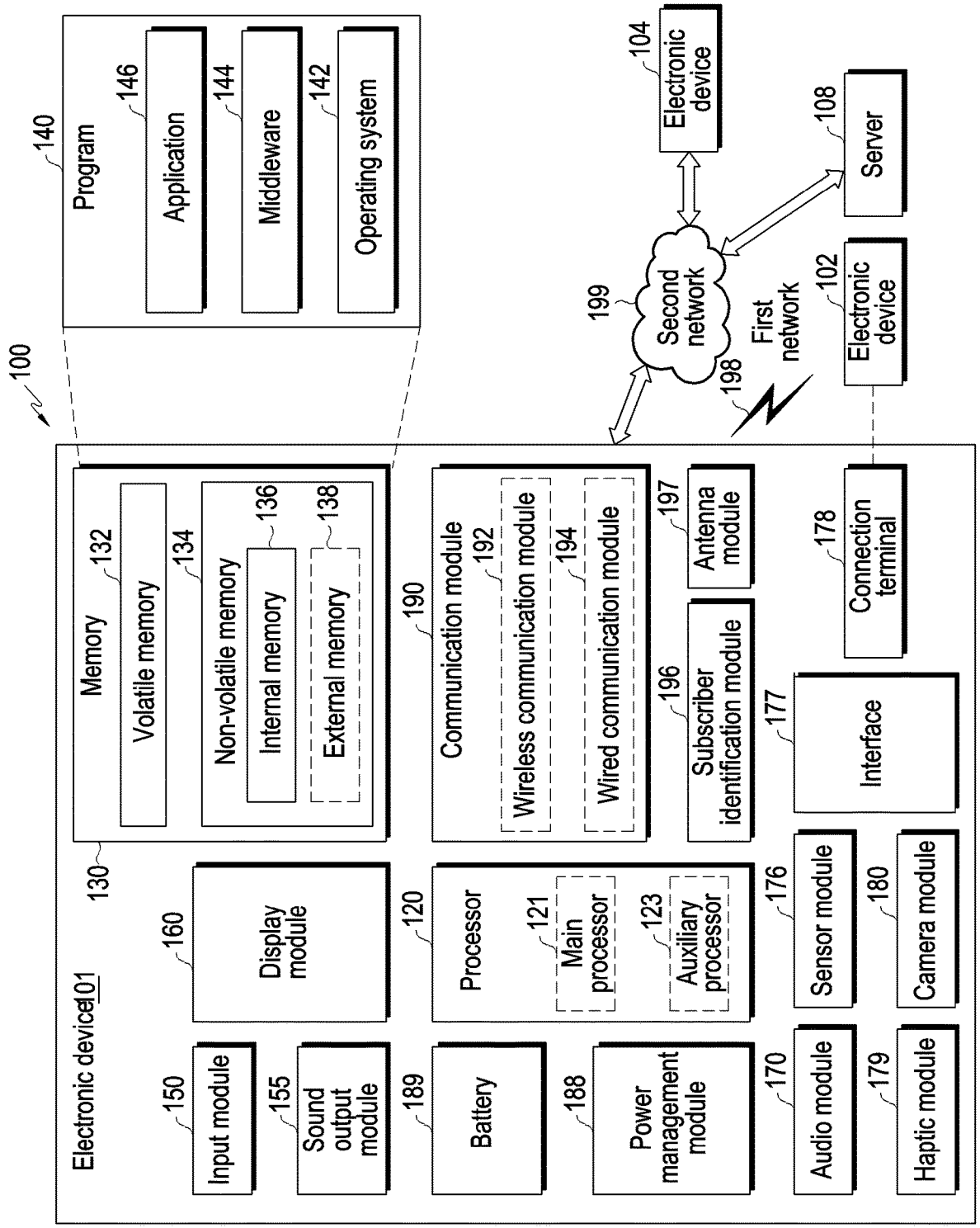
FIG. 1 is a block diagram illustrating an electronic device within a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
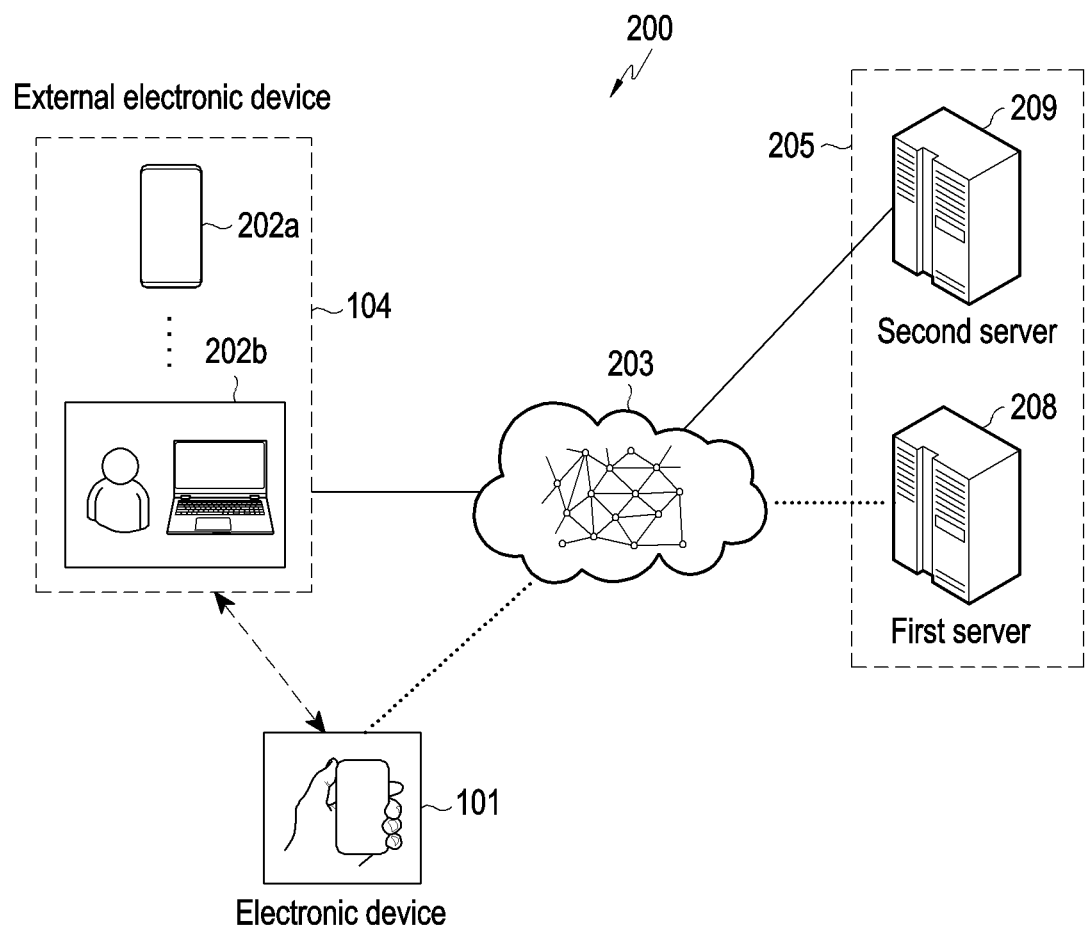
FIG. 2 is a diagram illustrating a system for sharing an ID and a password according to certain embodiments.

FIG. 2 is a diagram illustrating a system for sharing an ID and a password according to certain embodiments.

Referring to FIG. 2, a system 200 for sharing an ID and a password may include an electronic device 101, at least one server 205 (for example, a first server 208 and a second server 209), and at least one external electronic device 104.

According to certain embodiments, the electronic device 101 is a device receiving a service from the first server 208 and is connected to the external electronic device 104 to support a sharing service to allow a counterpart to log in a service which a user desires to share and use the service.

According to an embodiment, the electronic device 101 may register in advance at least one sharing target an ID and a password. An operation for registering a sharing target may be an operation for authenticating an electronic device of the user to share the ID and the password and a counterpart electronic device performing an automatic login to at least one service using the shared ID and password.

According to an embodiment, in the operation for registering the sharing target, the user authentication and the counterpart authentication may be performed through a security authentication. For example, the user of the electronic device 101 may designate a sharing target, and when identification information of the sharing target, for example, a counterpart phone number, a counterpart ID, and device information of the external electronic device 104 are input by the user when the sharing target is registered, the electronic device 101 may transfer the input identification information of the sharing target to at least one server 205.

According to an embodiment, at least one server 205 may include the first server 208 and the second server 209. For example, the electronic device 101 may transfer the input identification information of the sharing target to a counterpart server, that is, the second server 209 through the first server 208. Accordingly, the second server 209 may generate a request for authenticating the counterpart to the external electronic device 104 corresponding to the identification information of the sharing target, and the counterpart may perform security authentication based on the counterpart's biometric information. As described above, when the security authentication between the user and the counterpart is successful, the operation for registering the sharing target may be completed.

According to an embodiment, the electronic device 101 may select at least one service desired to be shared in a service list and encrypt and provide the ID and the password to allow the counterpart to automatically log in the selected service and use the service. For example, the electronic device 101 may perform an operation for inputting an ID and a password configured by the user through a login screen during a process of accessing the service, and when the ID and the password are shared, the external electronic device 104 registered as the sharing target may automatically perform a login operation without a separate ID and password input. For example, the external electronic device 104 may display the security-processed ID and password in the login screen. Accordingly, the external electronic device 104 may perform login without exposure of the ID and the password, and thus it is possible to prevent personal information such as the ID and the password to be shared by the user from being leaked.

According to an embodiment, an encryption key may be used as one of the methods of encrypting the ID and the password. Accordingly, the electronic device 101 and the external electronic device 104 may share an encryption key used to encrypt and decrypt the ID and the password. For example, a shared encryption key shared between the electronic device 101 and the external electronic device 104 may be generated during the operation for registering the sharing target. For example, the shared encryption key may be referred to as a service shared key (SSK) and may be generated and issued by the external electronic device 104.

According to an embodiment, when the security authentication between the electronic device 101 and the external electronic device 104 is successful in the operation for registering the sharing target, the external electronic device 104 may issue the shared encryption key. According to an embodiment, the external electronic device 104 may encrypt the shared encryption key using a one-time password (OTP) in order to share the same with the electronic device 101, and transfer the encrypted shared encryption key to the electronic device 101 through the first server 208 connected to the second server 209. At this time, the external electronic device 104 may encrypt the shared encryption key as its own unique key and store the same in order to use the shared encryption key for decrypting the encrypted ID and password. According to an embodiment, when receiving the encrypted ID and password, the external electronic device 104 may decrypt the same through the shared encryption key, and according to the user of the external electronic device 104 may perform automatic log using the decrypted ID and password without inputting the ID and the password.

According to certain embodiments, at least one external electronic device 104 may communicate with the electronic device 101 through a short-range communication scheme, or configure a home network through an access device, for example, an access point (AP) to communicate. According to an embodiment, at least one external electronic device 104 may include at least one home appliance, such as a smartphone 202*a*, a computer 202*b*, a TV, a smart refrigerator, a smart washing machine, or an air conditioner, but is not limited thereto.

The network 203 may be a data communication network, a private network, or a public network. For example, examples of the network 203 may include at least one of a person area network covering a home, a local area network covering a building, a wide area network covering areas connected over boundaries of big cities, regions, or countries, or Internet.

According to certain embodiments, the first server 208 may communicate with the electronic device 101 of the user through the network 203. The first server 208 is a server for providing a service which the user of the electronic device 101 desires to receive and may need a login in the operation for providing the service. Accordingly, the electronic device 101 may perform the login through an ID and a password. The login may be an operation of identifying a personal account during a process of accessing a website or an application operated by the first server 208 through the electronic device 101.

According to an embodiment, the first server 208 may need a user authentication in the operation for registering the sharing target. The user authentication may be implemented through various biometric authentication schemes, such as a fingerprint authentication including a user authentication, and fingering recognition through a fingerprint sensor included in the electronic device 101 and the operation for authenticating the recognized fingerprint may be performed. According to an embodiment, in addition to the fingerprint authentication, various user authentication schemes using an authentication application may be applied. Further, for a mutual authentication in the operation for registering the sharing target, an authentication of a counterpart part may be needed as well as the authentication of the user. Accordingly, the first server 208 may generate a request for authenticating the counterpart to the external electronic device 104 through the second server 209, and the operation for authenticating a user of the external electronic device 104 may be performed in the external electronic device 104.

According to an embodiment, the service provided by the first server 208 may include a content service and services in various fields such as electronic commerce. For example, the content service may be a service for providing images, videos, or music contained in multimedia content, but the service type is not limited thereto. According to an embodiment, for example, the first server 208 may correspond to a cloud server.

According to certain embodiments, the second server 209 is a server communicating with the external electronic device 104 and may provide the external electronic device 104 with information utilized for the login operation to allow the external electronic device 104 to perform the login and use a service, for example, a website or an application used by the electronic device 101. According to an embodiment, the second server 209 may correspond to a server of a partner company.

Figure 3:
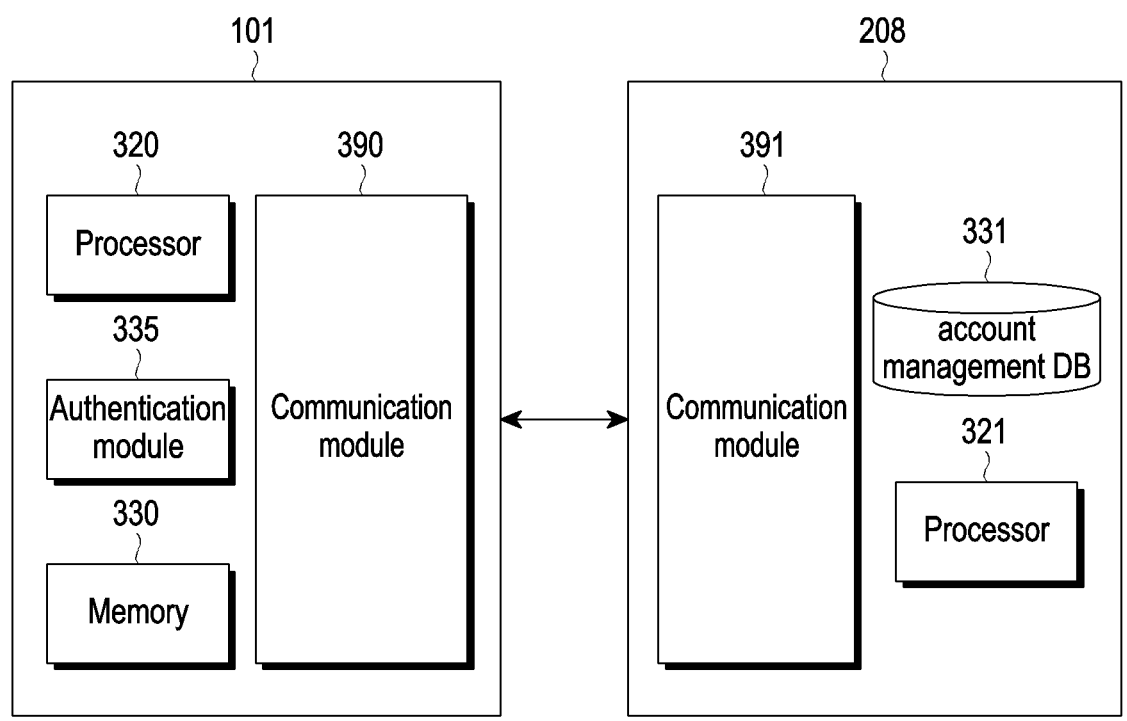
FIG. 3 is an internal block diagram illustrating an electronic device for sharing an ID and a password according to certain embodiments.

FIG. 3 is an internal block diagram illustrating an electronic device for sharing an ID and a password according to certain embodiments. The electronic device 101 of FIG. 3 may be the electronic device 101 of FIG. 1.

Referring to FIG. 3, the electronic device 101 may include at least one processor 320, a memory 330, an authentication module 335, and/or a communication module 390. According to certain embodiments, the processor 320 may generate a user account in the first server 208, and the user may log in its own account through, for example, an ID and a password used in the first server 208.

According to certain embodiments, the processor 320 may register a service which the user desires to share as a sharing target. According to an embodiment, the processor 320 may perform a user authentication through the authentication module 335 in order to provide the external electronic device 104 with registration of the sharing target and an ID and a password for at least one service to be shared with the sharing target. As described above, in order to share the ID and the password, an operation for mutually connecting the user and the counterpart may be performed, which may be performed through a request from the user of the electronic device 101 and the user authentication.

According to certain embodiments, the authentication module 335 may acquire information for the user authentication. For example, the processor 320 may access the first server 208 through the authentication module 335 to perform the user authentication. At this time, the user authentication may be performed by a predetermined scheme, such as a knowledge-based authentication method using a password or a signature image, a possession-based authentication method using SMS or email, and a question and answer method as well as a biometric authentication method using a user's fingerprint, iris, or face through the authentication module 335, and any authentication method capable of authenticating the user like a user ID authentication method can be used as well as the above-described methods.

According to certain embodiments, after the user authentication is completed, the processor 320 may receive an input of information on the sharing target from the user. According to an embodiment, in order to register the sharing target, the processor 320 may receive an input of counterpart information, for example, information which can be identified through the network, such as a counterpart ID or phone number.

According to an embodiment, the processor 320 may transmit the input information on the sharing target to the first server 208 through the communication module 390, and may generate a request for the user authentication to the external electronic device 104 corresponding to the input information on the sharing target through the first server 208. At this time, an authentication scheme used by the electronic device 101 and an authentication scheme used by the external electronic device 104 may be different from each other, and a protocol for data communication therebetween may be made using server communication in an encryption type.

After the mutual authentication between the user and the sharing target is completed through the operation, when the processor 320 receives an input selecting at least one service to be shared with the sharing target from the user, the processor may transfer at least one service for which the sharing target uses automatic login function to the first server 208 through the communication module 390.

According to certain embodiments, the memory 330 may store data on the sharing target and at least one service to be shared with the sharing target. According to an embodiment, the data may be encrypted by the encryption key of the electronic device 101 and stored in the memory 330. For example, the encryption key of the electronic device 101 may be a user account-based encryption key to encrypt data indicating the sharing target input by the user for sharing and the service to be shared and may be referred to as a device service key (DSK). According to an embodiment, the encryption key of the electronic device 101 may be encrypted by a unique key of the electronic device 101 in order to prevent extortion by a third party and stored in the memory 330. For example, the unique key of the electronic device 101 may correspond to a device root key (DRK).

According to certain embodiments, the processor 320 may store, in the memory 330, the encryption key shared between the electronic device 101 and the external electronic device 104 in the operation for registering the sharing target. For example, the shared encryption key may be referred to as a service shared key (SSK) to share data with a counterpart. According to an embodiment, the shared encryption key may be encrypted by the unique key of the electronic device 101 to prevent extortion by a third party and stored in a secure area (for example, trust zone) of the memory 330. As described above, according to an embodiment, the encrypted data for at least one service to be shared with the sharing target and the shared encryption key (for example, SSK) used for encrypting the data may be separately encrypted and stored. The shared encryption key, as stored in the secure area, can be accessed via a predetermined authentication scheme.

According to certain embodiments, the communication module 390 may communicate with the external electronic device 104. According to an embodiment, the communication module 390 may wirelessly or wiredly perform communication, and may transmit data related to the service to be shared to the external electronic device 104 and receive a response corresponding thereto.

According to an embodiment, the configuration of the electronic device 104 may be similar to or the same as the electronic device 101 of FIG. 3. According to an embodiment, the external electronic device 104 may also include the communication module, the memory, and at least one processor.

According to an embodiment, the processor of the external electronic device 104 may authenticate the user of the external electronic device 104 in response to an authentication request for registering the sharing target from the electronic device 101. According to an embodiment, the processor of the external electronic device 104 may receive at least one service to be shared and shared data obtained by encrypting an ID and a password for the at least one service from the electronic device 101 through an external server (for example, the first server 208 or the second server 209). Further, the processor of the external electronic device 104 may display the ID and the password that are security-processed for the at least one service based on the shared data, and may perform an operation for log in the service through the ID and the password in response to selection for the at least one service.

Meanwhile, referring to FIG. 3, the first server 208 may include at least one processor 321, an account management DB 331, and/or a communication module 391. According to an embodiment, since the configuration of the second server 209 is similar to or the same as the configuration of the first server 208, a detailed description thereof is omitted.

According to certain embodiments, the processor 321 may generate a request for authenticating the user to an electronic device of the sharing target, that is, the external electronic device 104 in order to authenticate the sharing target based on information on the sharing target, received from the electronic device 101. For example, the processor 321 of the first server 208 may identify the second server 209 connected to the external electronic device 104 corresponding to information on the sharing target and may generate a request for authenticating the user of the external electronic device 104 to the second server 209. When the authentication for the user of the external electronic device 104 is completed, a user authentication result may be received from the second server 209 through the communication module 391.

According to certain embodiments, when the user authentication therebetween is completed, the processor 321 may share the encryption key between the external electronic device 104 and the electronic device 101. According to an embodiment, the processor 321 may receive a shared encryption key, for example, an SSK issued based on the user authentication by the external electronic device 104 through the second server 209. According to an embodiment, the shared encryption key may be issued by the external electronic device 104 or the second server 209 and may be stored in each of the electronic device 101 and the external electronic device 104.

According to certain embodiments, the processor 321 may store data on the electronic device 101, for example, the sharing target, the service to be shared, and data obtained by encrypting the ID and the password for the service. According to an embodiment, the processor 321 may store a list of targets to share in the memory, for example, the account management DB 331 and store at least one service and encrypted data including an ID and a password for the service as well as information on the sharing target by using the encryption key of the electronic device 101. According to an embodiment, information on the sharing target, the service to be shared, and the ID and the password for the service may be referred to as shared data. For example, the account management DB 331 may store user information, information on a sharing target for identifying the sharing target (for example, a user ID, and a phone number), information on a service to be shared (for example, a service ID and a service name), an ID and a password for each service, and information for identifying sharing in a field form.

For example, the processor 321 may encrypt the shared data by using the encryption key of the electronic device 101, for example, a DSK and store the same in the account management DB 331 of the first server 208. On the other hand, the second server 209 may store shared data related to the electronic device 101, and may perform encryption and storage by using the encryption key of the electronic device 104, for example, a partner's key. The partner's key may be an encryption key used by the second server 209 and the external electronic device 104.

According to certain embodiments, an electronic device may include a communication module, a memory, and at least one processor operatively connected to the communication module and the memory, wherein the at least one processor may be configured to perform an authentication for registering an external electronic device as a sharing target, receive selection for at least one service to be shared with the external electronic device, encrypt data including an ID and a password for the at least one service in response to the selection for the at least one service, transmit a request for sharing the encrypted data to a server through the communication module to allow the external electronic device to use the at least one service without exposure of the ID and the password, receive a response to the sharing request from the server through the communication module, and inform of completion of sharing of the ID and the password for the at least one service, based on the reception of the response.

According to certain embodiments, the at least one processor may be configured to acquire a shared encryption key used for encrypting or decrypting the ID and the password for the at least one service.

According to certain embodiments, the shared encryption key may be generated by the external electronic device in response to the authentication.

According to certain embodiments, the at least one processor may be configured to identify whether an updated is generated according to a change in at least one of the ID and the password for the at least one service, and encrypt the updated data by the shared encryption key and transmit the encrypted updated data to the external electronic device through the server in response to the generation of the update.

According to certain embodiments, the at least one processor may be configured to perform an authentication for a user of the electronic device and a user of the external electronic device in order to register the external electronic device as the sharing target based on a predetermined authentication scheme.

According to certain embodiments, the at least one processor may be configured to receive an input for identification information of the external electronic device in order to register the external electronic device as the sharing target.

According to certain embodiments, the at least one processor may be configured to encrypt the shared encryption key by a unique key of the electronic device and store the encrypted shared encryption key in a secure area of the memory.

According to certain embodiments, a service may include a communication module, a memory, and at least one processor operatively connected to the communication module and the memory, wherein the at least one processor may be configured to perform an authentication with an external electronic device in response to a request for an authentication for registering the external electronic device as a sharing target from an electronic device, receive encrypted data including an ID and a password for at least one service to be shared with the external electronic device from the electronic device, and transmit the encrypted data to the external electronic device to allow the external electronic device to use the service without exposure of the ID and the password in response to the reception of the encrypted data.

According to certain embodiments, the at least one processor may be configured to acquire a shared encryption key used for encrypting or decrypting the ID and the password from the external electronic device in response to the authentication with the external electronic device.

According to certain embodiments, the shared encryption key may be generated by the external electronic device.

According to certain embodiments, the at least one processor may be configured to perform an authentication for a user of the external electronic device in response to the reception of the encrypted data, and transmit the encrypted data to the external electronic device when the authentication for the user of the external electronic device is completed.

According to certain embodiments, the at least one processor may be configured to receive updated data encrypted by the shared encryption key in response to generation of an update according to a change in at least one of the ID and the password for the at least one service, and transmit the encrypted updated data to the external electronic device.

Figure 4:
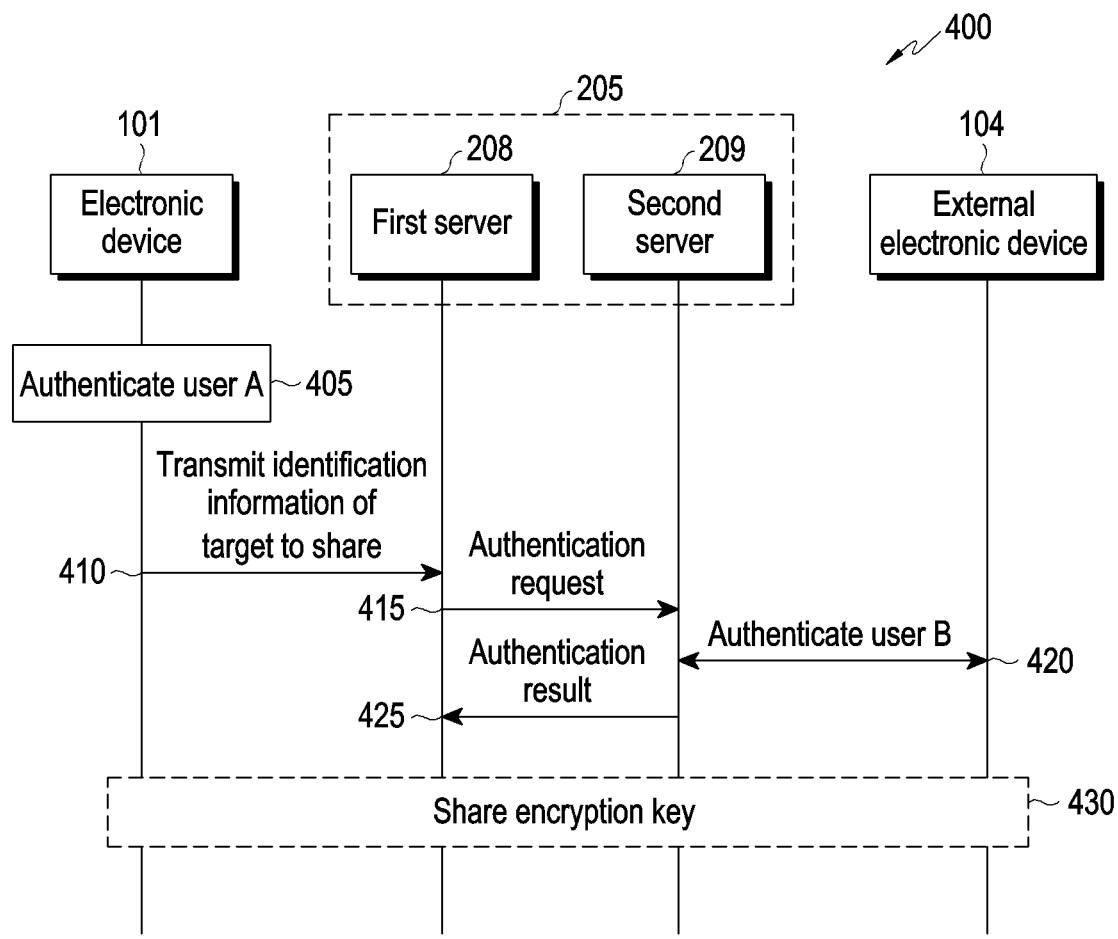
FIG. 4 is a signal flowchart illustrating an operation for registering a sharing target in a system for sharing an ID and a password according to certain embodiments.

FIG. 4 is a signal flowchart 400 indicating an operation for registering a sharing target in a system for sharing an ID and a password according to certain embodiments.

Referring to FIG. 4, the electronic device 101 may authenticate a user (for example, user A) of the electronic device 101 in operation 405, and transfer identification information identifying the sharing target to the external server 205 after the user authentication in operation 410. In response to reception of the identification information for the sharing target, the first server 208 of the external server 205 may generate a request for the authentication to the second server 209 associated with the sharing target in operation 415. The second server 209 may generate a request for authenticating a user (for example, user B) of the external electronic device 104 and perform the user authentication in operation 420. Based on the user authentication result, the second server 209 may transfer the authentication result to the first server 208 in operation 425 to complete the mutual authentication operation. Accordingly, the operation for registering the sharing target may be completed.

According to an embodiment, when the sharing target is registered, if the mutual authentication is successful, the electronic devices are proved as reliable electronic devices, and thus the electronic device 101 and the external electronic device 104 may share the encryption key (for example, SSK) in operation 430. The encryption key commonly shared between the electronic device 101 and the external electronic device 104 may be an encryption key used for encrypting or decrypting shared data. The encryption key may be issued by the external electronic device 104 which is an entity receiving shared data, and an entity issuing the encryption key may be the second server 209. The operation for sharing the encryption key is described in detail with reference to FIG. 10. Although FIG. 4 describes that the operation for sharing the encryption key is performed after the operation for registering the sharing target, the encryption key may be generated and shared when the sharing target is registered. For example, external electronic device 104 may generate the encryption key to be shared after the authentication for the user (for example, user B) of the external electronic device 104 is completed, the external electronic device 104 may generate the encryption key to be shared when the authentication for the user (for example, user B) is performed, insert the encryption key into the authentication result, and transmit the same to the electronic device 101.

Figure 5A:
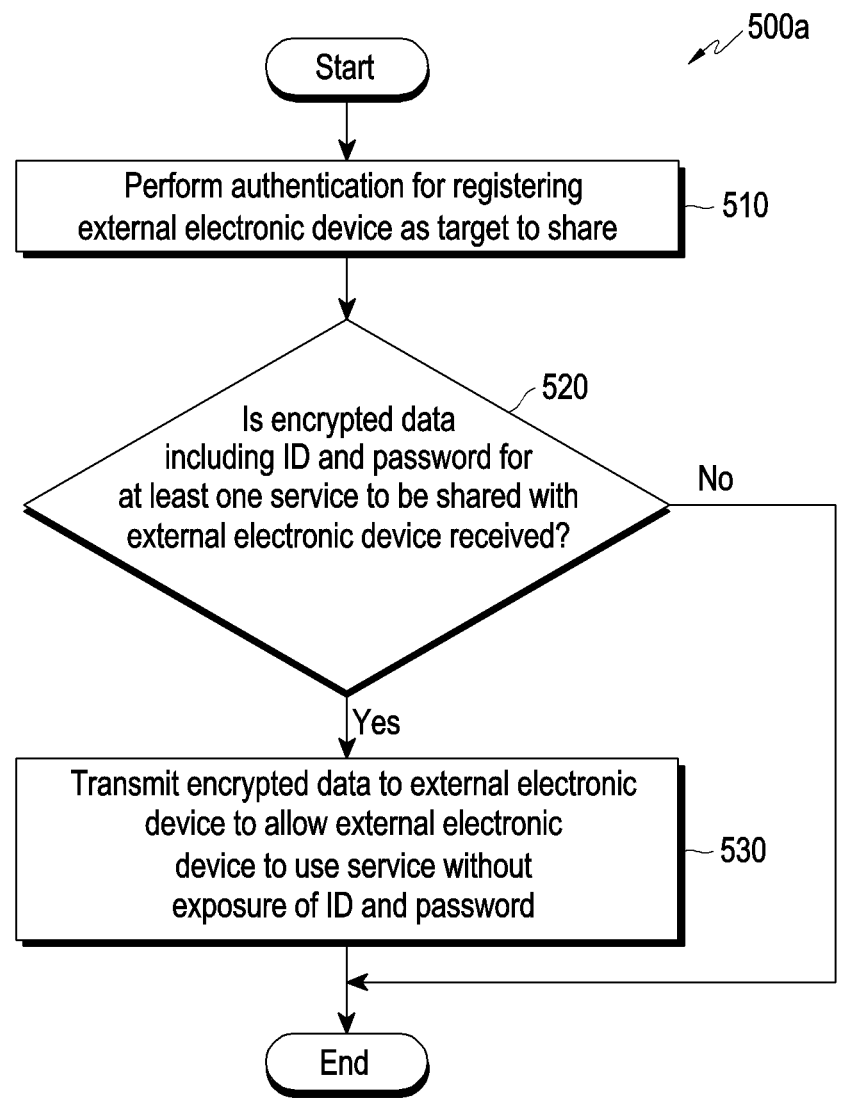
FIG. 5A is a flowchart illustrating an operation of a server for sharing an ID and a password according to certain embodiments.

FIG. 5A is a flowchart 500a illustrating the operation of a server for sharing an ID and a password according to certain embodiments.

Referring to FIG. 5A, the operation method may include operations 510 to 540. Each step/operation of the operation method of FIG. 5A may be performed by a server (for example, at least one of at least one server 205 of FIG. 2, the first server 208 of FIG. 3, and at least one processor (for example, the processor 321 of FIG. 3) of the first server of FIG. 2). In an embodiment, at least one of operations 510 to 540 may be omitted, orders of some operations may be changed, or other operations may be added. Referring to FIG. 5A, the first server 208 may execute an authentication of the external electronic device 104 in response to an authentication request for registering the external electronic device 104 as a sharing target from the electronic device 101 in operation 510. Accordingly, when the authentication with the external electronic device 104 is completed, the first server 208 may register the external electronic device in a list of targets to share.

In operation 520, the first server 208 may receive encrypted data including an ID and a password for at least one service to be shared with the external electronic device 104 from the electronic device 101. According to an embodiment, the first server 208 may receive the sharing target, selected by the user of the electronic device 101 and data in which the ID and the password for at least one service to be shared with the sharing target are encrypted. For example, the first server 208 may consider the reception of the encrypted data as a request for sharing the at least one service.

According to an embodiment, the method may further include an operation for acquiring a shared encryption key used for encrypting or decrypting the ID and the password from the external electronic device 104 in response to the authentication with the external electronic device 104.

Accordingly, the first server 208 may acquire the shared encryption key used for encrypting or decrypting the ID and the password for the at least one service and transfer the acquired shared encryption key to the electronic device 101. For example, when authenticating the user of the external electronic device 104 in the operation for registering the sharing target, the first server 208 may acquire the shared encryption key from the external electronic device 104 through the second server 209.

In operation 530, the first server 208 may transfer the encrypted data to the external electronic device 104, so that the external electronic device 104 can access the desired surface using the encrypted credentials. This may allow the external electronic device 104 to use the service without exposure of the ID and the password in response to reception of the encrypted data.

According to an embodiment, the first server 208 may encrypt the received encrypted data and data on the electronic device 101 by using an encryption key (for example, DSK) and store the same. At this time, the encryption key (for example, DSK) of the electronic device 101 may be provided in advance to the first server 208 and may be shared in an encrypted state using, for example, a one-time encryption key (for example, one time password (OTP)). Further, a shared encryption key transferred from the first server 208 to the electronic device 101 may also be shared in an encrypted state using the one time encryption key. Accordingly, although the first server 208 receives encrypted data from the electronic device 101 or acquires the shared encryption key from the external electronic device 104, the encrypted data cannot be decrypted without user's consent (or user authentication). That is, since an encryption scheme in which not only the first server 208 but also the second server 209 cannot identify the data without the user authentication is used, security performance can be guaranteed.

According to an embodiment, the first server 208 may authenticate the user of the external electronic device 104 in response to reception of the encrypted data. When the authentication for the user of the external electronic device 104 is completed, the external electronic device 104 is allowed to use (or access) the shared encryption key utilized for decrypting the encrypted data.

For example, when the authentication for the user of the external electronic device 104 is completed, the first server 208 may transfer the encrypted data to the external electronic device 104.

In another example, when the first server 208 receives selection for at least one service and the authentication for the user of the external electronic device 104 is completed, the first server 208 may transfer data in which an ID and a password for the at least one service are encrypted to the external electronic device 104 among data (for example, a mapping information table 1116) including pre-stored IDs and passwords for respective services. For example, when encrypted data for each service is stored in advance in the first server 208, the electronic device 101 may provide selection information for at least one service to the first server 208 without transmitting the encrypted data, and the first server 208 may transfer the encrypted data corresponding to the selection to the external electronic device 104.

Meanwhile, since stopping sharing may be requested by the user of the electronic device 101 after the ID and the password are shared, the first server 208 may synchronize shared data with the electronic device 101. At this time, a time point at which the synchronization is performed may be performed when changed data may be identified such as a request for stopping from the electronic device 101 or attempt for the service login by the external electronic device 104, and synchronization based on changed (or updated) data may be performed between the electronic device 101 and the external electronic device 104.

According to an embodiment, the method may further include an operation of identifying whether an updated is generated according to a change in at least one of the ID and the password for the at least one service and an operation of encrypting the updated data by the shared encryption key and transmitting the encrypted updated data to the external electronic device 104 through the first server 208 in response to the generation of the update.

According to an embodiment, the method may further include an operation of receiving updated data encrypted by the shared encryption key in response to generation of an update according to a change in at least one of the ID and the password for the at least one service and transmitting the encrypted updated data to the external electronic device 104.

Figure 5B:
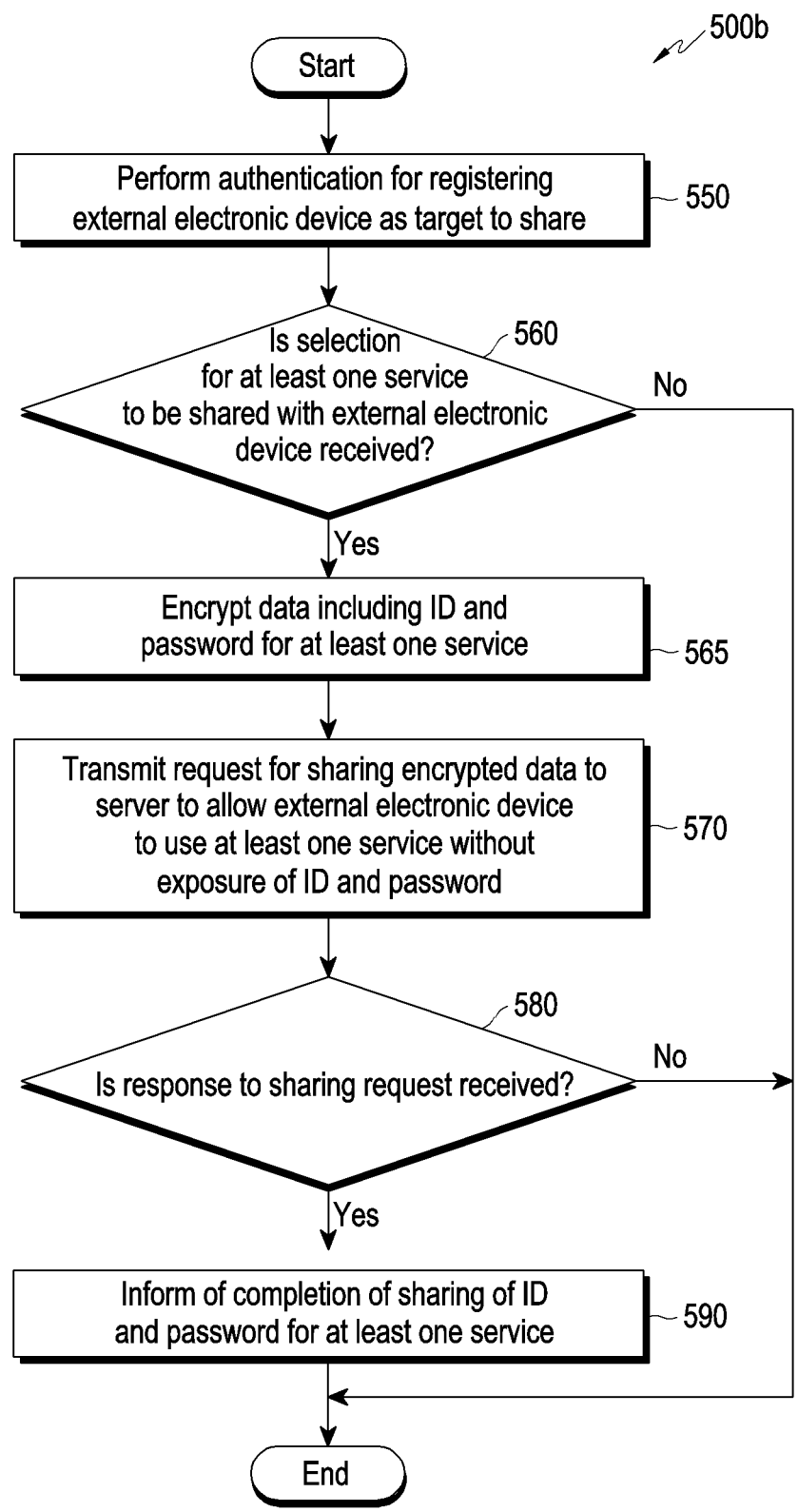
FIG. 5B is a flowchart illustrating an operation of an electronic device for sharing an ID and a password according to certain embodiments.

FIG. 5B is a flowchart 500*b* illustrating the operation of an electronic device for sharing an ID and a password according to certain embodiments.

Referring to FIG. 5B, the operation method may include operations 550 to 590. Each step/operation of the operation method of FIG. 5B may be performed by an electronic device (for example, at least one of the electronic device 101 of FIG. 1, the electronic device 101 of FIG. 2, the electronic device 101 of FIG. 3, and at least one processor (for example, the processor 120 of FIG. 1 and the processor 320 of FIG. 3) of the electronic device) of the first server of FIG. 2). In an embodiment, at least one of operations 550 to 590 may be omitted, orders of some operations may be changed, and other operations may be added.

In operation 550, the electronic device 101 may execute authentication of the external electronic device 104 for registering the external electronic device 104 as a sharing target.

In operation 560, the electronic device 101 may detect whether at least one service has been selected to be shared with the external electronic device 104.

In operation 565, the electronic device 101 may encrypt credential data including an ID and a password for accessing the at least one service in response to the selection for the at least one service.

In operation 570, the electronic device 101 may transmit a request to the first server 208 for sharing of the encrypted data to the external electronic device, to allow the external electronic device to use the at least one service without exposure of the ID and the password in response to the selection for the at least one service. According to an embodiment, the request for sharing may be a request for allowing the first server 208 to transfer the data in which the ID and the password for at least one selected service are encrypted to the external electronic device 104. According to an embodiment, the request for sharing may include the at least one selected service and selection information for the ID and the password for the at least one selected service.

In operation 580, the electronic device 101 may receive a response to the transmitted request for sharing from the first server 208.

In operation 590, the electronic device 101 may generate a notification that indicates completion of sharing the ID and the password for the at least one service based on the reception of the response.

According to an embodiment, the method may include an operation of acquiring a shared encryption key used for encrypting or decrypting the ID and the password for the at least one service.

According to an embodiment, the method may further include an operation of identifying whether an updated is generated according to a change in at least one of the ID and the password for the at least one service and an operation of encrypting the updated data by the shared encryption key and transmitting the encrypted updated data to the external electronic device through the server in response to the generation of the update.

According to an embodiment, the operation of performing the authentication may include an operation of performing an authentication for a user of the electronic device and a user of the external electronic device in order to register the external electronic device as the sharing target, based on a predetermined authentication scheme.

Figure 6:
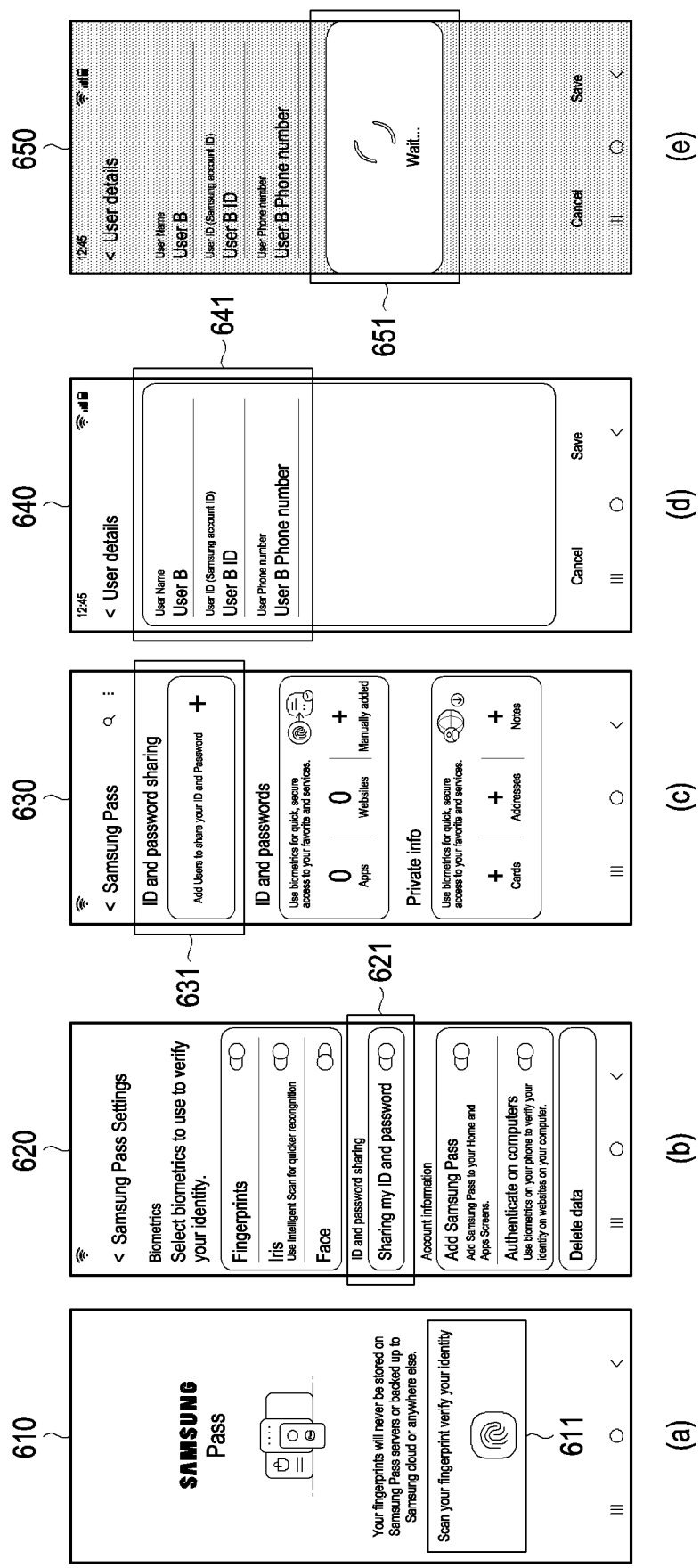
FIG. 6 illustrates examples of screens showing an operation for registering a sharing target by an electronic device according to certain embodiments.

FIG. 6 illustrates examples of screens showing an operation for registering a sharing target by an electronic device according to certain embodiments.

Although FIG. 6 illustrates the operation for registering the sharing target based on a biometric authentication, the user authentication scheme is not limited thereto, and a user authentication scheme used by the electronic device 101 and a user authentication scheme used by the external electronic device 104 may be different from each other.

First, the electronic device 101 may authenticate a user (for example, user A) of the electronic device 101 to register the sharing target. Authentication of a user may be executed through a fingerprint authentication 611 via a user authentication screen 610 of FIG. 6A, and a function of sharing an ID and a password may be activated by the user in a password sharing configuration screen 620 of FIG. 6B, as indicated by reference numeral 621.

In FIG. 6C, when a button 631 for identifying a sharing target is selected in a screen 630, a screen 640 of FIG. 6D may be displayed, for receiving input of information on the sharing target. Information on the sharing target 641 may be input into the screen 640 of FIG. 6D, and information for identifying a counterpart may also be input, including, for example, a name, an ID, and a phone number of the sharing target may be input. In response to the input of the information on the sharing target, an authentication standby screen 650 of FIG. 6E may be displayed. In the authentication standby screen 650 of FIG. 6E, information 651 informing of waiting for the authentication for the user (for example, user B) of the external electronic device 104 may be displayed.

Figure 7:
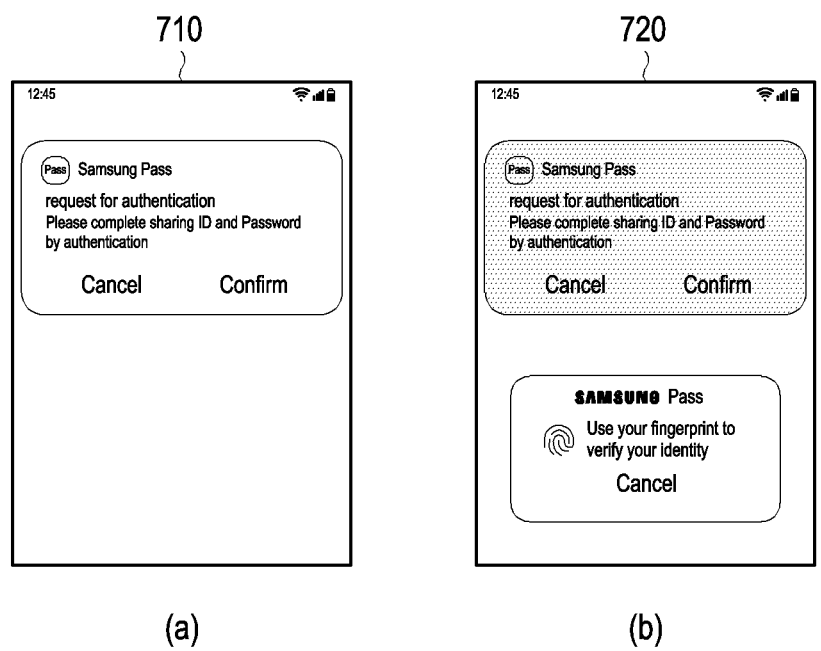
FIG. 7 illustrates examples of screens according to a user authentication request when the same authentication scheme is used by an external electronic device according to certain embodiments.

FIG. 7 illustrates examples of screens according to a user authentication request when the same authentication scheme is used by an external electronic device according to certain embodiments.

In a user authentication request screen 710 of FIG. 7A, a fingerprint authentication scheme is illustrated. According to an embodiment, the user authentication scheme may display a prompt for authenticating and confirming whether a user is a valid sharing target to whom will be transmitted a shared encryption key. FIG. 7A illustrates a fingerprint authentication scheme (for example, Samsung Pass) as an example of the user authentication scheme, but it is understood that the user authentication scheme is not limited thereto. When the fingerprint authentication scheme is selected as one of the user authentication schemes, a request for authenticating a fingerprint of the user (for example, user B) of the external electronic device 104 may be made in a user authentication request screen 720 as illustrated in FIG. 7B. As described above, when the electronic device 101 and the external electronic device 104 use the same authentication scheme, a screen making a request for a user authentication to the external electronic device 104 through a push service based on, for example, a user ID may be displayed. When the user authentication is successful in the external electronic device 104 acquiring encrypted data, that is, the encrypted ID and password, the external electronic device can access the shared encryption key and accordingly may decrypt the encrypted data using the shared encryption key. Through the user authentication scheme, the electronic device 101 and the external electronic device 104 may decrypt the shared data that is shared therebetween and each server 208 or 209 cannot access the shared data, so that high security can be guaranteed.

Figure 8:
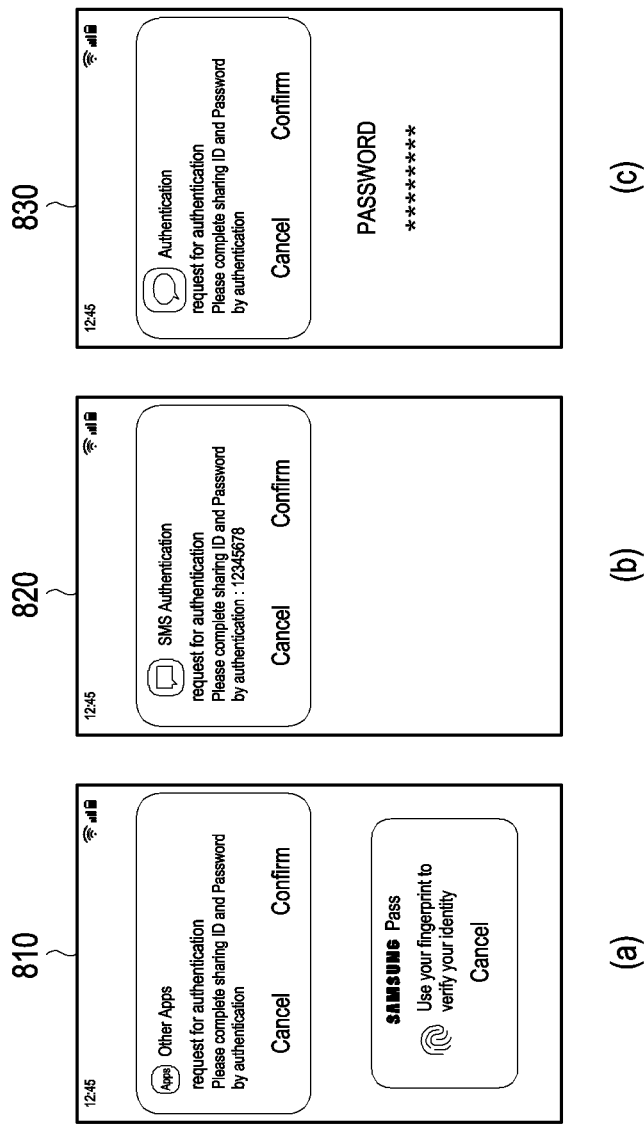
FIG. 8 illustrates examples of screens according to a user authentication request when a different authentication scheme is used by an external electronic device according to certain embodiments.

FIG. 8 illustrates examples of screens according to a user authentication request when a different authentication scheme is used by an external electronic device according to certain embodiments.

A user authentication request screen 810 of FIG. 8A shows, for example, an authentication scheme other than the fingerprint authentication scheme of FIGS. 7A-7B. When another authentication scheme is selected, a request for authenticating a user (for example, user B) of the external electronic device 104 may be executed through an authentication process involving an SMS authentication screen 820 and a password authentication screen 830 of FIGS. 8B and 8C, as illustrated, which indicates an example confirmation code "12345678" of screen 820, and input of the same, as seen in screen 830.

Figure 9:
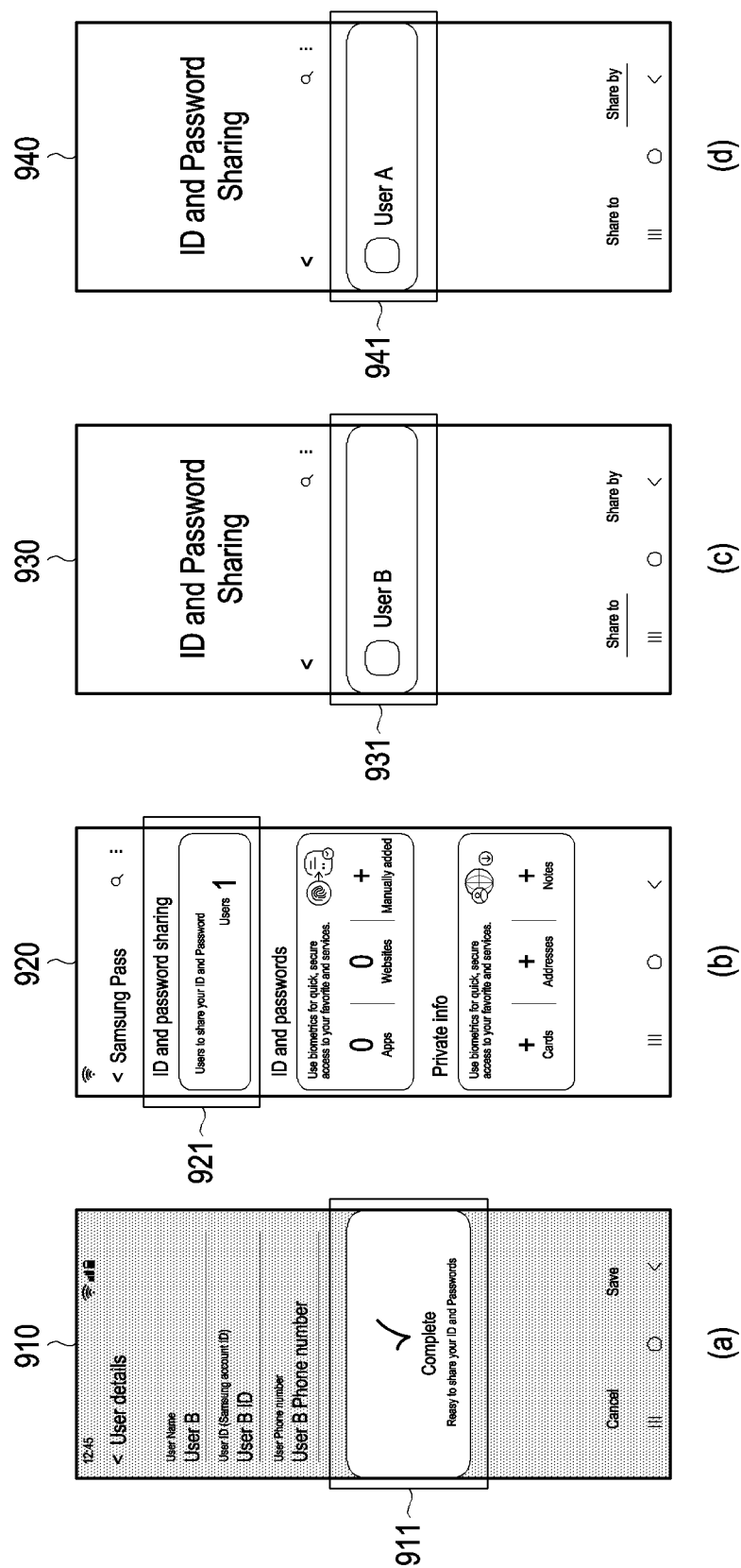
FIG. 9 illustrates examples of screens when a user authentication is completed by an electronic device and an external electronic device according to certain embodiments.

FIG. 9 illustrates examples of screens when a user authentication is completed by an electronic device and an external electronic device according to certain embodiments.

When an authentication for a user (for example, user B) of the external electronic device 104 is completed, a notification 911 may be generated indicating completion of the authentication, and may be displayed in an authentication completion screen 910 of the electronic device 101, as illustrated in FIG. 9A. At this time, the number 921 of sharing targets may be displayed in an authentication completion screen 920 of the electronic device 101 in FIG. 9B, and counterpart information 931 (such as, for example, information on user B) may be displayed in an authentication completion screen 930 of the electronic device 101 in FIG. 9C, in order to indicate who is the sharing target to which an ID and a password will be shared. Further, after user authentication is completed, user information 941 (for example, information on user A) may be displayed in an authentication completion screen 940 of the external electronic device 104 in FIG. 9D to show who is a user making a request for sharing.

Figure 10:
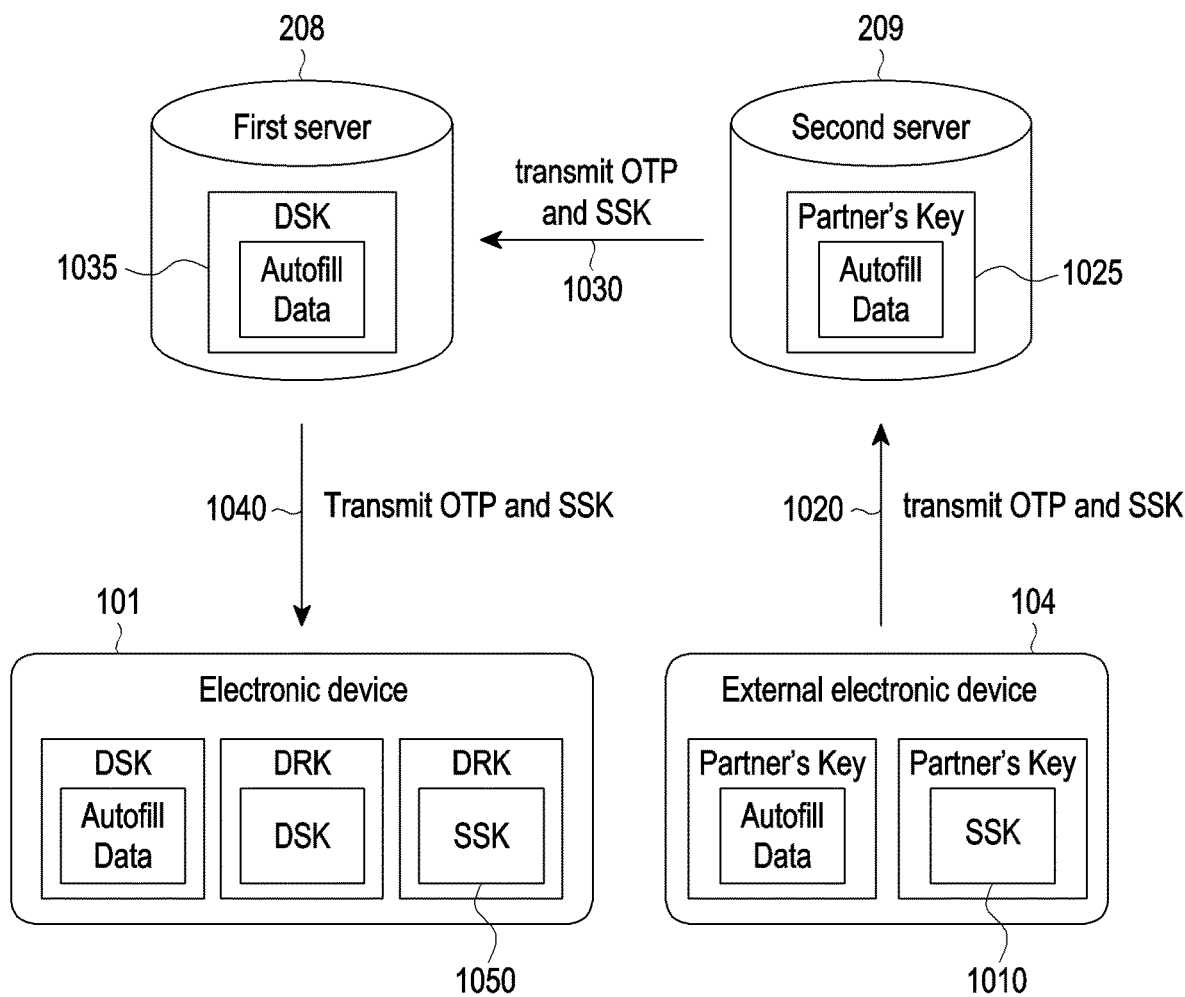
FIG. 10 illustrates an example for describing an encryption key sharing operation according to certain embodiments.

FIG. 10 illustrates an example for describing an encryption key sharing operation according to certain embodiments.

FIG. 10 illustrates an example operation for sharing the encryption key used for encrypting or decrypting shared data between the electronic device 101 and the external electronic device 104, and the shared encryption key may be stored in each of the electronic device 101 and the external electronic device 104.

Referring to FIG. 10, the encryption key may be generated by a sharing target, such as, for example, the external electronic device 104, and then shared through a user authentication scheme. According to an embodiment, the external electronic device 104 may issue the encryption key based on a user authentication. For example, the encryption key to be shared may be an encryption key of a service shared with the external electronic device 104, and may be referred to as a service shared key (SSK). The external electronic device 104 may encrypt the generated encryption key by a one-time password (OTP) to share the same through a user authentication scheme (for example, Samsung Pass). Further, the external electronic device 104 may encrypt the shared encryption key (for example, SSK) by using an encryption key (for example, partner key) of the external electronic device 104 in a security area in order to use the shared encryption key for decrypting shared data in the future in operation 1010. The partner key may be an encryption key used by the second server 209 and the external electronic device 104.

According to an embodiment, the external electronic device 104 may transfer the shared encryption key (e.g., the SSK) along with the OTP to the second server 209 in operation 1020 in order to share the shared encryption key (e.g., SSK). When receiving the shared encryption key along with the OTP, the second server 209 may transfer the same to the first server 208 in operation 1030. According to an embodiment, the second server 209 may encrypt data on the external electronic device 104 using the partner key, and store the data as indicated by reference numeral 1025, and encrypt shared data (or updated shared data) with the electronic device 101 using the shared encryption key, and separately manage the same.

Meanwhile, when receiving the shared encryption key along with the OTP through the second server 209, the first server 208 may transfer the same to the electronic device 101 in operation 1040. According to an embodiment, the first server 208 may encrypt data on the electronic device 101 by using an encryption key (for example, DSK) of the electronic device 101 and store the same, and may encrypt shared data with the external electronic device 104 by using the shard encryption key and separately manage the same.

As illustrated in FIG. 10, the electronic device 101 may encrypt the shared encryption key using a unique key (e.g., DRK) of the electronic device 101 and store the same in a secure area in operation 1050 in order to prevent extortion of the shared encryption key. The unique key (e.g., DRK) of the electronic device 101 may be used not only for encrypting the shared encryption key, but also for encrypting the encryption key (e.g., DSK) of the electronic device 101. Main data, except for the shared data within the electronic device 101, may be encrypted by the encryption key (for example, DSK) of the electronic device 101 and stored.

As described above, the shared encryption key may be shared between the electronic device 101 and the external electronic device 104 in the operation for registering the sharing target and may be shared when a user authentication through a user authentication scheme is successful to prevent extortion of the shared encryption key.

Figure 11:
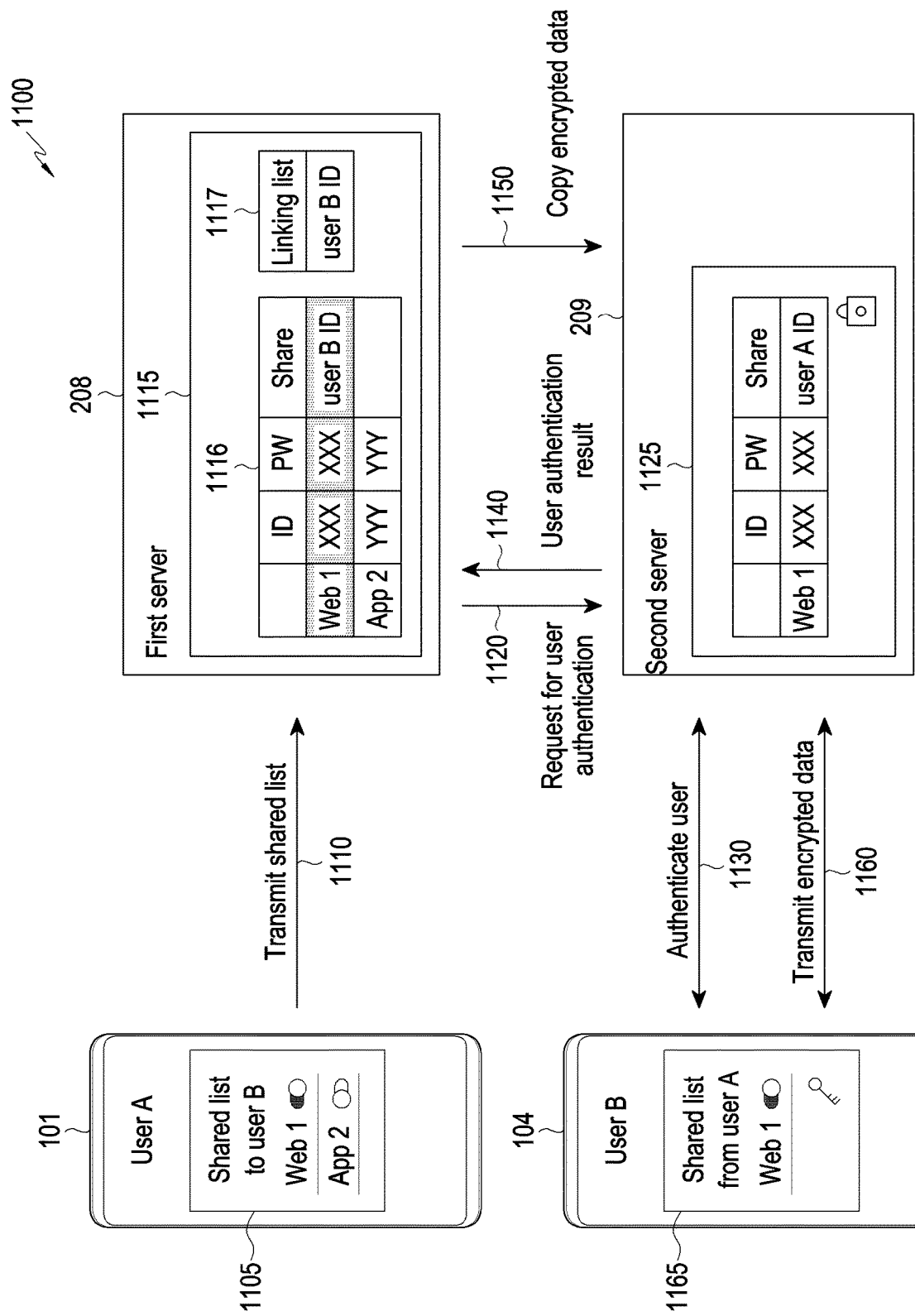
FIG. 11 illustrates an example for describing an ID and password sharing operation according to certain embodiments.

FIG. 11 illustrates an example 1100 for describing an operation for sharing an ID and a password according to certain embodiments.

Referring to FIG. 11, after authenticating a user (for example, user A) of the electronic device 101, the electronic device 101 may receive an input 1105 selecting at least one service (for example, website 1) to be shared with a sharing target, from the user of the electronic device 101. In response to the selection, the electronic device 101 may transfer a shared list including at least one selected service to the first server 208 in operation 1110, and generate a request for authenticating a user (for example, user B) of the external electronic device 104 to the second server 209 in operation 1120. Accordingly, a user authentication may be performed between the second server 209 and the external electronic device 104 in operation 1130, and when the user authentication is completed, the second server 209 may transfer a user authentication result to the first server 208 in operation 1140. As described above, when authentication for the user (for example, user B) of the external electronic device 104 is completed, the first server 208 may generate an entry (e.g., one or more database fields) for storing information on the sharing target in a predetermined storage space 1115 (for example, the account management DB 331). For example, the first server 208 may store an ID and a password for each service to be shared in a mapping information table 1116 and may map each service to information on the sharing target and store the same. For example, when sharing of the shared service is allowed, identification information (for example, user B ID) of the sharing target may be mapped. According to an embodiment, the first server 208 may separately manage a list 1117 of targets to share. At this time, the mapping information table 1116 may be encrypted and stored to prevent extortion or forgery and alteration by a third party. For example, the first server 208 may encrypt the mapping information table 1116 and the list 1117 of targets to share by using the shared encryption key (for example, SSK) issued in the operation for registering the sharing target and store the same.

Meanwhile, the first server 208 may encrypt shared data corresponding to the user (for example, user B ID) of the external electronic device 104 and transfer the same to the second server 209 in operation 1150. For example, the first server 208 may transfer shared data obtained by encrypting an ID and a password for website 1 by using the shared encryption key to the second server 209. In response thereto, the second server 209 may manage the encrypted shared data in the database field form (or table form) like the first server 208. For example, the shared service, the ID and the password for the shared service, and identification information of the user (for example, user A ID) allowing sharing may be mapped and stored in the table 1125 generated by the second server 209. At this time, when storing the table 1125, the second server 209 may encrypt the table using the shared encryption key and store the same. Further, the second server 209 may transfer the encrypted shared data to the external electronic device 104 in operation 1160.

According to an embodiment, when acquiring the encrypted shared data, the external electronic device 104 may decrypt the encrypted shared data using the shared encryption key (for example, SSK). Through the decryption of the shared data, the external electronic device 104 may acquire the ID and the password utilized for logging into the shared service, and may be allowed to access, for example, website 1 as indicated by reference numeral 1165. At this time, since the external electronic device 104 displays the security-processed ID and password in the shared service screen, the user of the external electronic device 104 may be able to perform the automatic login, but will not ever see the actual ID and password.

Meanwhile, the operation for sharing the ID and the password between the electronic device 101 and the external electronic device 104 has been described above, but the operation can be equally performed for 1:N sharing as well as 1:1 sharing.

Figure 12:
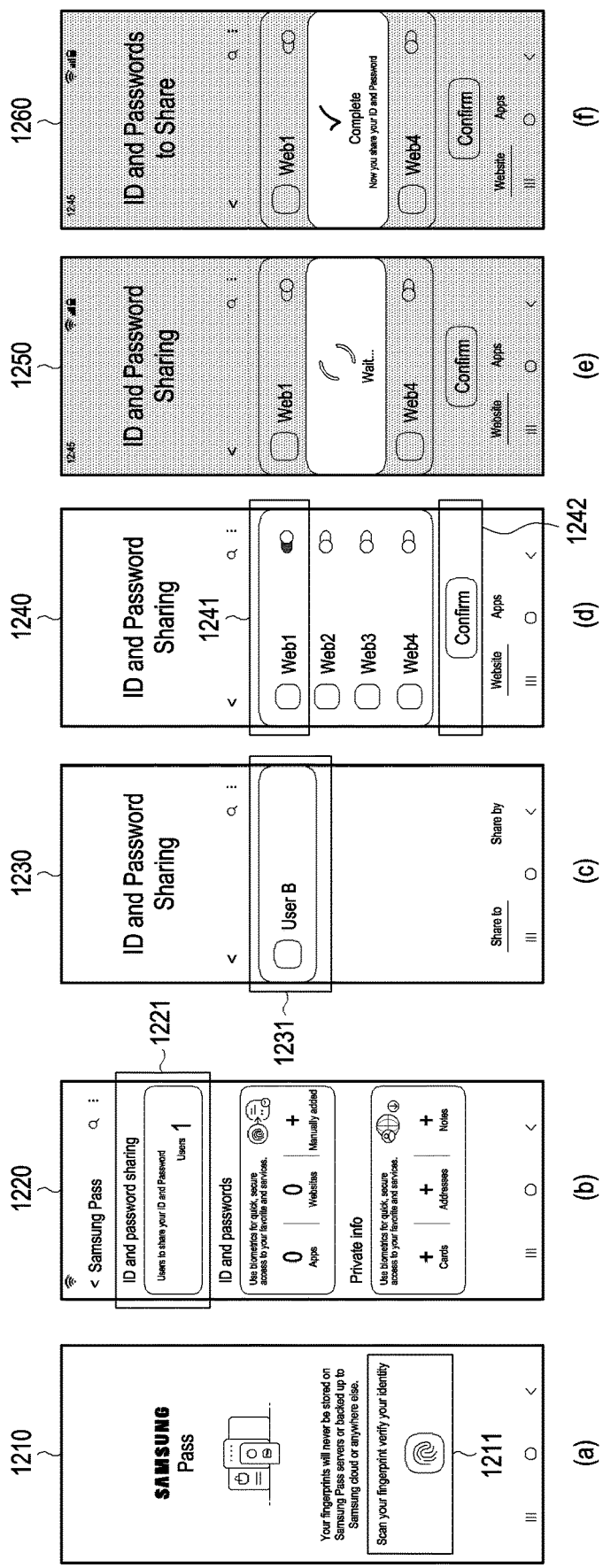
FIG. 12 illustrates examples of screens showing an ID and password sharing operation of an electronic device according to certain embodiments.

FIG. 12 illustrates examples of screens showing an ID and password sharing operation of an electronic device according to certain embodiments.

In order to share an ID and a password, an authentication for a user (for example, user A) of the electronic device 101 may be first performed as shown in a user authentication screen 1210 of FIG. 12A. Although FIG. 12A illustrates fingerprint authentication 1211, a user authentication scheme is not limited thereto. If the user authentication is completed, an ID and password sharing function may be activated in an ID and password sharing configuration screen 1220 of FIG. 12B according to user selection as indicated by reference numeral 1221. Subsequently, the electronic device 101 may receive an input of user selection 1231 for a sharing target (for example, user B) in a screen 1230 for selecting the sharing target in FIG. 12C.

Although FIG. 12C illustrates that the number of targets to share is one, two or more targets to share can be selected from among a plurality of targets to share. FIG. 12D illustrates that a service to be shared is selected in a shared service selection screen 1240. According to an embodiment, when the service to be shared is selected, a selection item for an ID to be shared for the service may be added in the shared service selection screen 1240. For example, since a plurality of user accounts (or user IDs) may exist for one service (for example, website or application), the shared service selection screen 1240 may further include an item for selecting a user ID and a password to be shared among a plurality of user IDs for the shared service. When at least one service is selected in the shared service selection screen 1240, and the ID and the password for the at least one selected service are selected, the electronic device 101 may transmit a request message including the at least one selected service and selection information for the ID and the password therefor to the first server 208.

As described above, an operation for selecting the shared service in the shared service selection screen 1240 of FIG. 12D as indicated by reference numeral 1241 and then confirming the selection as indicated by reference numeral 1242 may correspond to the shared service request. In response to the request, the external electronic device 104 may display a screen 1250, awaiting authentication of the user (for example, user B) of the external electronic device 104, as illustrated in FIG. 12E. When the authentication for the user (for example, user B) of the external electronic device 104 is completed, the electronic device 101 may display a notification indicating completion of sharing of the ID and the password with the sharing target, as shown in a completion screen 1260 of FIG. 12F.

Hereinafter, the case in which family members share their own IDs and passwords for services to which the family members subscribe through a media service is described by way of example. When it is assumed that a family member subscribes to a video service x, a family member b subscribes to a video service y, and a family member c subscribes to a music service z, the respective members a, b, and c may link their subscriptions with a TV at home through their own electronic devices. In this case, the electronic device of the member a may share an ID and a password used for the video service x with the TV in response to selection by the member a. Further, an electronic device of the member b and an electronic device of the member c may also share IDs and passwords used for the video service y and the music service z with the TV in the same way. As described above, the respective members may use services of each other through the TV according to member information configured (or registered) in the TV. Accordingly, when all family members are linked to the TV as targets to share, the members a, b, and c may conveniently use the video service x, the video service y, and the music service z through the TV even though they do not know the IDs and the passwords for the services.

Meanwhile, the case in which the user provides the ID and the password to the user b is described by way of example. When it is assumed that the user a desires to provide the service x corresponding to a premium service to the user b, the user a may link with the electronic device of the user b through its own electronic device and then configure to share the premium service. In this case, the user b may receive the premium service x through its own electronic device even though the user b does not know directly the ID and the password of the user a.

Figure 13:
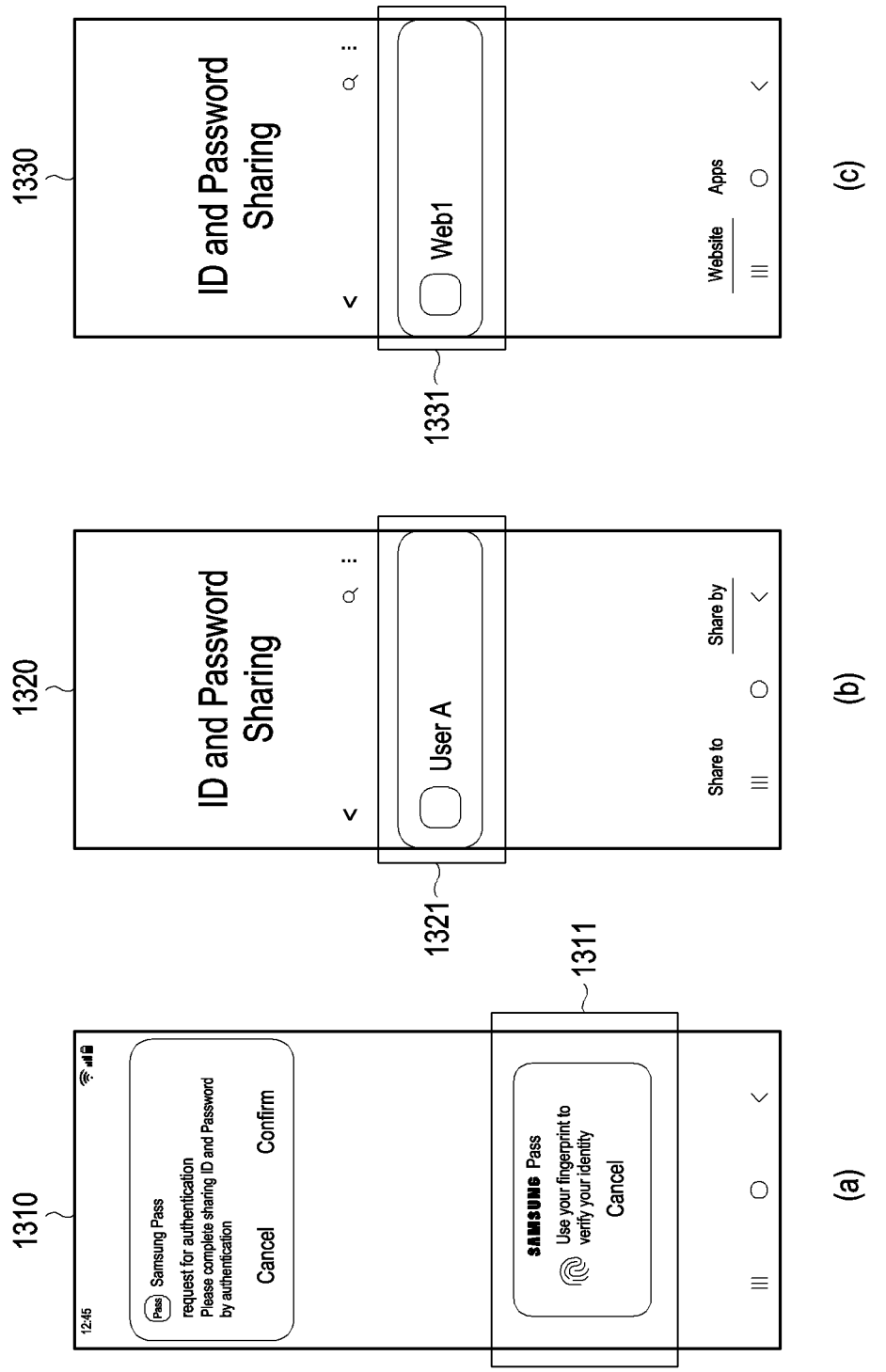
FIG. 13 illustrates examples of screens showing an ID and password sharing completion operation of an external electronic device according to certain embodiments.

FIG. 13 illustrates examples of screens showing an ID and password sharing completion operation of an external electronic device according to certain embodiments.

In accordance with shared data including the shared service and the ID and the password for the service from the electronic device 101, the first server 208 may authenticate a sharing target using the stored list 1117 of targets to share and accordingly a user authentication screen 1310 of FIG. 13A may be displayed. An authentication for the user (for example, user B) may be completed through a fingerprint authentication 1311 in a user authentication screen 1310 and, when the user authentication is completed, the second server 209 may load data to be shared among data on the electronic device 101 stored in the first server 208. For example, the second server 209 may load the shared data including the shared service and the ID and the password for the service from the first server 208, and the shared data may be transmitted in an encrypted state.

According to an embodiment, after finally identifying whether sharing of the shared data through the second server 209 is successful, the first server 208 may add data indicating that the shared data is shared with the user (for example, user B) to data related to the user of the electronic device 101 and store the same.

Accordingly, identification information (for example, user A ID) 1321 of the user allowing sharing of the ID and the password may be displayed in a sharing completion screen 1320 of FIG. 13B, and information 1331 for the shared service may be displayed in a sharing completion screen 1330 of FIG. 13C in order to indicate which service is allowed to be shared. As described above, according to certain embodiments, the user of the external electronic device 104 may identify information on the type of the shared service and the user requesting (or allowing) sharing. At this time, the information on the type of the shared service and the user requesting sharing is displayed but the ID and the password are processed to prevent exposure, and thus the user of the external electronic device 104 may identify a service for which the shared ID and password can be used but cannot identify the actual ID and password.

Figure 14:
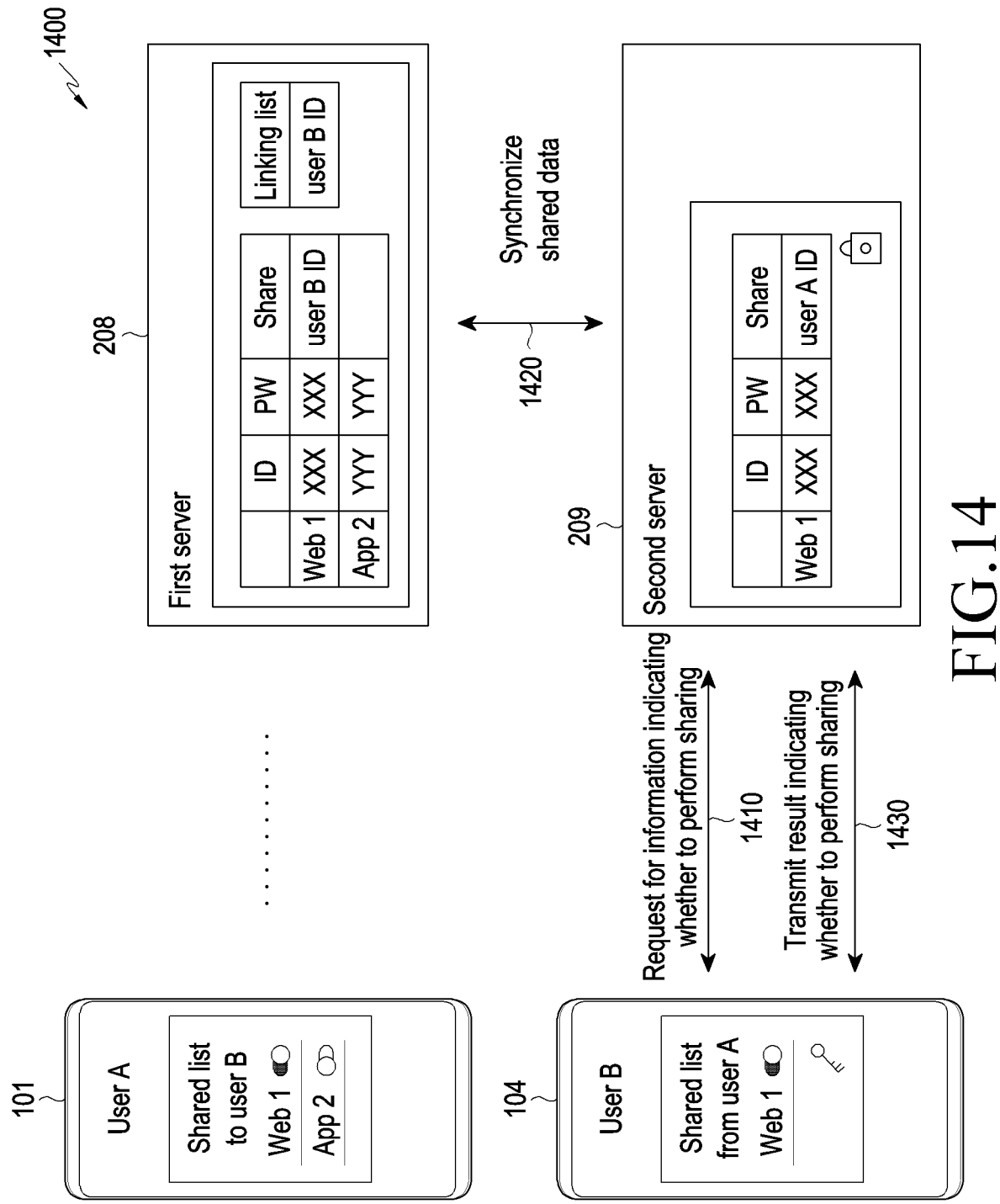
FIG. 14 illustrates an example for describing a data synchronization operation according to certain embodiments.

FIG. 14 illustrates an example 1400 for describing a data synchronization operation according to certain embodiments.

Referring to FIG. 14, when a user (for example, user B) of the external electronic device 104 attempts a login using an ID and a password shared for a shared service, authentication of the user of the external electronic device 104 may be executed. When the authentication is completed, an operation is executed to determine whether the actual shared ID and password can be used. According to an embodiment, in order to use shared data including the ID and the password, the external electronic device 104 may generate a request for information indicating whether to perform sharing to the second server 209 in operation 1410. For example, even though the external electronic device 104 has the shared ID and password, cessation of the sharing may be configured in the electronic device 101 by the user (for example, user A) of the electronic device 101 at a time point at which the actual shared ID and password are used. Accordingly, in order to identify whether the request to cease sharing is configured, the external electronic device 104 may generate a request for information indicating whether to continue sharing, and transmit the request to the second server 209.

In response to the request for the information indicating whether to perform the sharing, the second server 209 may identify whether to maintain the sharing through the first server 208. According to an embodiment, when the request for information indicating whether to maintain sharing from the external electronic device 104 is received, the second server 209 may identify whether to maintain the sharing through shared data synchronization with the first server 208 in response to the request for information indicating whether to continue the sharing in operation 1420. For example, when the user attempts a login to website 1 among at least one service included in the shared list from the electronic device 101 in the external electronic device 104, the external electronic device 104 may transmit a request for determining whether to continue sharing website 1 to the second server 209. When the user (for example, user B) of the external electronic device 104 has configured an item indicating whether to continue sharing website 1 through shared data synchronization with the first server 208, the second server 209 may determine that sharing is allowed. Accordingly, the second server 209 may transmit the result indicating whether to continue sharing to the external electronic device 104 in operation 1430.

Meanwhile, it has been described that the second server 209 identifies whether to perform sharing in response to the request for information indicating whether to perform the sharing, but data synchronization may be performed between the first server 208 and the second server 209 in response to a request for stopping sharing from the electronic device 101. For example, when there is a request for information indicating whether to perform sharing from the external electronic device 104, the second server 209 may identify whether to perform the sharing based on pre-synchronized shared data. In this case, since the second server 209 has already identify whether to perform sharing through shared data synchronization with the first server 208, the operation for identifying whether to perform the sharing from the first server 208 may be omitted.

According to an embodiment, the external electronic device 104 may decrypt shared data, for example, the ID and the password for logging into the shared service by using the possessed shared encryption key (for example, SSK) based on the result indicating whether to perform sharing. Accordingly, the external electronic device 104 may security-process or blind-process the decrypted ID and password such that the ID and the password are displayed as "*" in the service screen, for example, the login screen of website 1 in which the login is performed. Accordingly, the user (for example, user B) of the external electronic device 104 can perform the login using the shared ID and password without directly inputting the ID and the password but cannot identify the actual ID and password, and thus it is possible to prevent private information such as the ID and the password shared by the user (for example, user A) of the electronic device 101 from being leaked.

Figure 15:
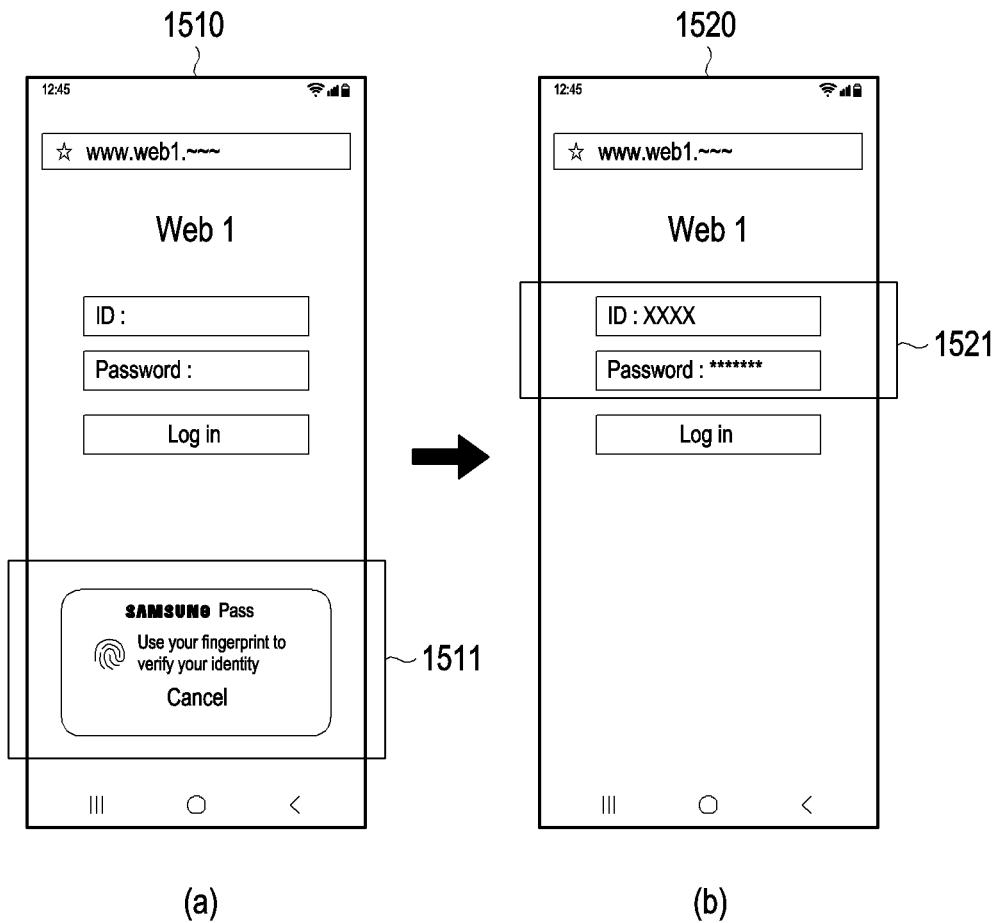
FIG. 15 illustrates examples of screens showing a login operation using an ID and a password shared with an external electronic device according to certain embodiments.

FIG. 15 illustrates examples of screens showing a login operation using an ID and a password shared with an external electronic device according to certain embodiments.

FIG. 15A illustrates an example in which the user of the external electronic device 104 performs login using a shared ID and password. As illustrated in FIG. 15A, in order for the user of the external electronic device 104 to use the shared ID and password in a login screen 1510 to access the shared service a user authentication may be requested. For example, FIG. 15A illustrates the case in which a fingerprint authentication 1511 is requested. When user authentication through fingerprint authentication is successful, an automatic login screen 1520 may then be displayed as illustrated in FIG. 15B. At this time, when the authentication for the user of the external electronic device 104 is completed, the external electronic device 104 may display automatically the security-processed ID and password, as indicated by reference numeral 1521.

Meanwhile, FIGS. 15A and 15B illustrate the case in which one ID and one password are automatically input for one shared service, for example, website 1, but the user of the external electronic device 104 may select one of a plurality of IDs and attempt the login because there may be the plurality of IDs for one shared service.

Figure 16:
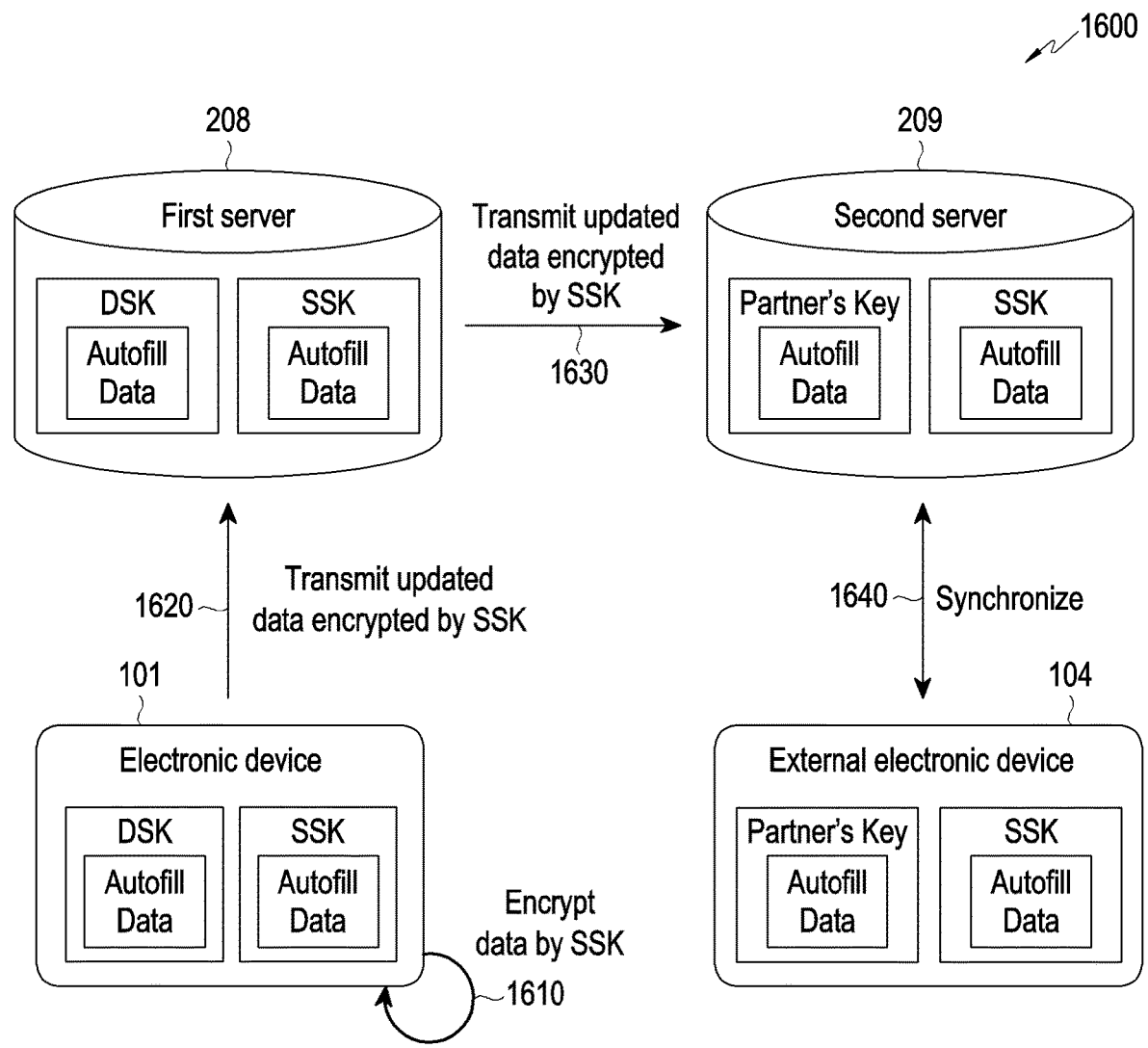
FIG. 16 illustrates an example for describing a data synchronization operation by an electronic device according to certain embodiments.

FIG. 16 illustrates an example 1600 for describing a data synchronization operation by an electronic device according to certain embodiments. In FIG. 16, synchronization for shared data between the electronic device 101 and the external electronic device 104 is started by the electronic device 101.

Referring to FIG. 16, the electronic device 101 may encrypt shared data using the encryption key of the electronic device 101 and store the same in a secure area within the memory 330 in order to prevent security leakages, such as extortion or forgery and alteration, by a third party. According to an embodiment, the encryption key of the electronic device 101 may be an encryption key based on a user account. For example, in order to encrypt shared data indicating a sharing target and a service to be shared, a user input requesting sharing, and/or a DSK of the electronic device 101 may be used.

When at least one of the ID or the password for at least one service is changed by the user, the shared data may be updated. In this case, the electronic device 101 may encrypt data (or, e.g., autofill data 1035 of FIG. 10), for example, updated shared data by using the shared encryption key (for example, SSK) with the external electronic device 104 in operation 1610 and transfer the updated shared data to the first server 208 in operation 1620. For example, the electronic device 101 may encrypt data corresponding to a part in which the updated is generated in the entire shared data by using the SSK.

According to an embodiment, the first server 208 may encrypt the same shared data as that of the electronic device 101 by using the encryption key (for example, DSK) of the electronic device 101 and store the same, and when the updated shared data encrypted by the shared encryption key (for example, SSK) is received, transfer the same to the second server 209 in operation 1630. In response thereto, the second server 209 may perform synchronization with the external electronic device 104 based on the encrypted updated shared data in operation 1640. For example, the second server 209 may also store the updated shared data encrypted by the shared encryption key (for example, SSK) in the state in which the second server stores the shared data by using the encryption key (for example, partner key) of the external electronic device 104 in the same way as the external electronic device 104.

According to an embodiment, when acquiring the updated shared data encrypted by the shared encryption key (for example, SSK), the external electronic device 104 may store the updated shared data in the encrypted state. Alternatively, when acquiring the updated shared data, the external electronic device 104 may immediately decrypt the updated shared data by using the shared encryption key which the external electronic device 104 already has. At this time, the shared encryption key which the external electronic device 104 already has may be encrypted in advance by using the encryption key (for example, partner key) of the external electronic device 104 and stored in a secure area (for example, trust zone) (see operation 1010 of FIG. 10). Through the decryption of the updated shared data, when logging in the shared service, the external electronic device 104 may perform the automatic log by using the updated shared data, that is, the updated ID or password. According to an embodiment, the external electronic device 104 may encrypt the updated ID or password by using the encryption key (for example, partner key) of the external electronic device 104 and store the same in the secure area in order to prevent extortion or forgery and alteration by a third party. As described above, according to an embodiment, the external electronic device 104 may separately encrypt and store the updated ID and password, and the shared encryption key.

Figure 17:
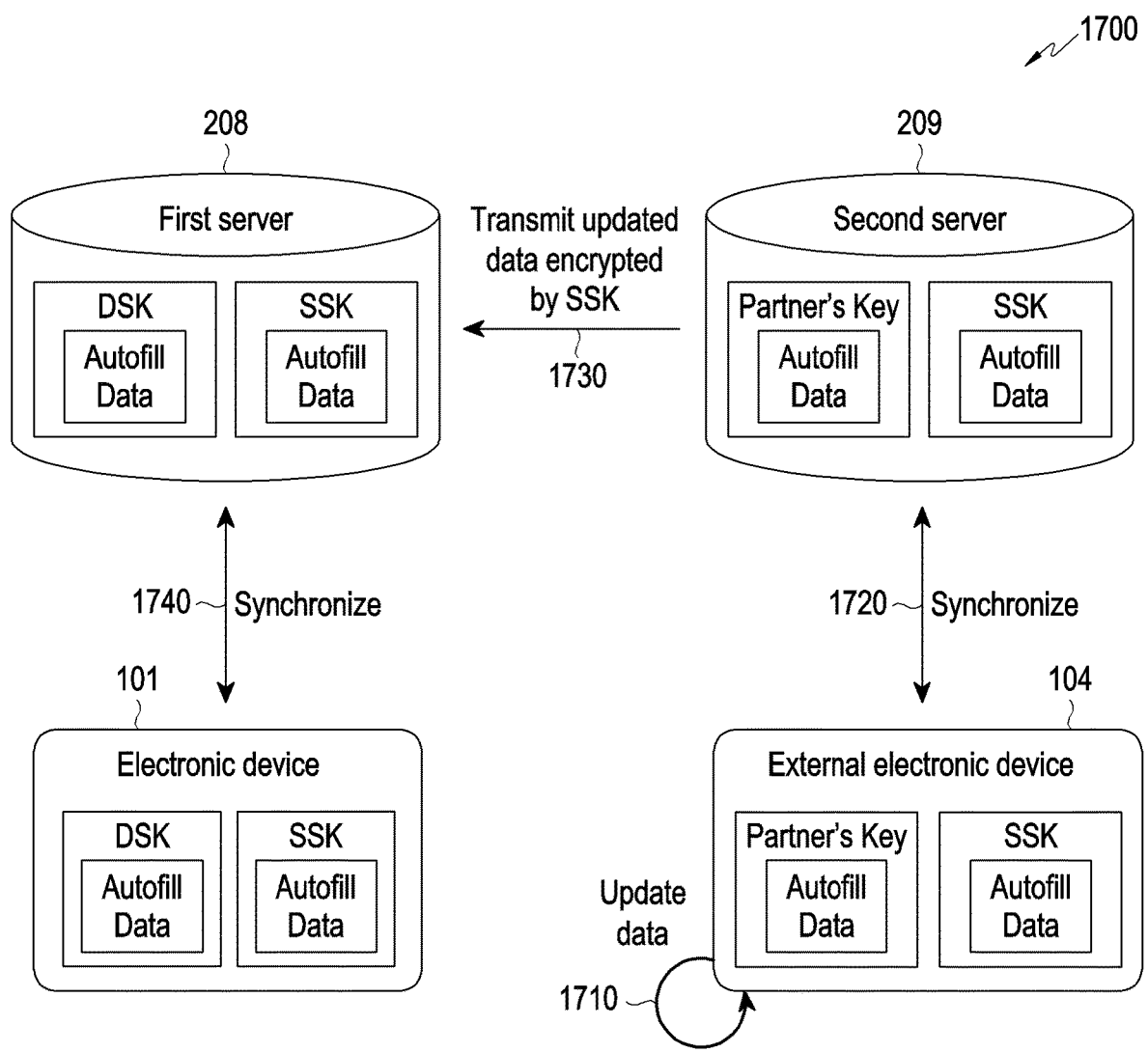
FIG. 17 illustrates an example for describing a data synchronization operation by an external electronic device according to certain embodiments.

FIG. 17 illustrates an example 1700 describing a data synchronization operation by an external electronic device according to certain embodiments. In FIG. 17, synchronization for shared data between the electronic device 101 and the external electronic device 104 is started by the external electronic device 104.

Referring to FIG. 17, according to an embodiment, synchronization by the external electronic device 104 may be initiated when a service different from that of the electronic device 101 is used. Alternatively, the initiation of synchronization may be performed when the user of the external electronic device 104 attempts login. According to an embodiment, when the user of the external electronic device 104 attempts login to a shared service, the external electronic device 104 may execute an operation for updating the shared data in operation 1710. Accordingly, the external electronic device 104 may synchronize updated shared data with the second server 209 in operation 1720. For synchronization, the second server 209 may transfer the updated shared data encrypted by the shared encryption key (for example, SSK) transmitted from the external electronic device 104 to the first server 208 in operation 1730. In response thereto, the first server 208 may perform synchronization with the electronic device 101 based on the updated shared data in operation 1740. Accordingly, the electronic device 101 may store the encrypted updated shared data, or may decrypt the encrypted updated shared data by using the shared encryption key (for example, SSK) which is already in the possession of the electronic device 101, and store the same in the secure area, in order to prevent security leakage, such as extortion or forgery and alteration by a third party. For example, the electronic device 101 may encrypt the decrypted updated shared data by using the encryption key (for example, DSK) of the electronic device 101 and store the same in the secure area.

As described above, according to certain embodiments, not only unidirectional synchronization but also bi-directional synchronization are possible, and thus the same data may be stored in the electronic device 101 and the external electronic device 104 through synchronization for updated shared data. accordingly, the user of the external electronic device 104 allowed to share can use the shared service equally to the electronic device 101 at any time and also perform the automatic login through the encrypted shared data without exposure of the shared ID and password, thereby increasing user convenience.

According to an embodiment, when an electronic device of a user shares an ID and a password, a server may encrypt the ID and the password and provide the same to a counterpart electronic device, thereby reducing a risk that the information will be leaked.

According to an embodiment, as the electronic device of the user provides the encrypted ID and password, the counterpart never sees the actual ID and password, and enhancing the security provided to the user even while sharing the desired access to the counterpart.

According to an embodiment, private information, such as IDs and passwords, are protected from leakage by allowing a counterpart to log into a desired website or application, without direct input of the ID and password.

The effects that can be realized by the disclosure are not limited to the above-described effects, and other effects that have not been mentioned may be clearly understood by those skilled in the art from the following description.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
communication circuitry;
at least one processor; and
memory storing instructions that, when executed by the at least one processor individually or collectively, cause the electronic device to:
acquire a shared encryption key from a server, wherein the shared encryption key is generated by a previously registered external electronic device;
receive a selection of at least one service to be shared with the external electronic device,
encrypt data including an user identification (ID) and a password associated with the at least one service in response to the selection, using the shared encryption key,
transmit a request for sharing the encrypted data to the server through the communication circuitry to allow the external electronic device to use the at least one service without exposure of the ID and the password,
receive a response to the transmitted request from the server through the communication circuitry, and generate a notification indicating whether the ID and the password are successfully shared for the selected at least one service, based on the received response.

2. The electronic device of claim 1, wherein the instructions cause the electronic device to:
acquire a shared encryption key used for encrypting and/or decrypting the ID and the password for the selected at least one service.

3. The electronic device of claim 2, wherein the shared encryption key is generated by the external electronic device in response to authentication.

4. The electronic device of claim 2, wherein the instructions cause the electronic device to:
generate update data based on detecting a change in at least one of the ID and the password for the at least one service, and
encrypt the update data via the shared encryption key and transmit the encrypted update data to the external electronic device through the server.

5. The electronic device of claim 1, further comprising registering the external electronic device as a sharing target further includes:
authenticating a user of the electronic device, and authenticating a user of the external electronic device based on a predetermined authentication scheme.

6. The electronic device of claim 1, wherein the instructions cause the electronic device to:
receive a user input of identification information identifying the external electronic device and registering the external electronic device as a sharing target.

7. The electronic device of claim 2, wherein the instructions cause the electronic device to:
encrypt the shared encryption key using a unique key of the electronic device, and store the encrypted shared encryption key in a secure area of the memory.

8. A server, comprising:
communication circuitry;
at least one processor; and
memory storing instructions that, when executed by the at least one processor individually or collectively, cause the server to:
execute authentication of an external electronic device and register the authenticated external electronic device as a sharing target,
acquire a shared encryption key in response to the executed authentication from the external electronic device, wherein the shared encryption key is generated by the external electronic device;
providing the shared encryption key to another server associated with an electronic device;
receive encrypted data including a user identification (ID) and a password for at least one service to be shared with the external electronic device from the another server associated with the electronic device, wherein the encrypted data is encrypted using the shared encryption key, and
transmit the encrypted data to the external electronic device to allow the external electronic device to use the at least one service without exposure of the ID and the password in response to the reception of the encrypted data.

9. The server of claim 8, wherein the instructions cause the server to: acquire a shared encryption key used for encrypting and/or decrypting the ID and the password for a selected at least one service from the external electronic device, in response to the executed authentication of the external electronic device.

10. The server of claim 8, wherein a shared encryption key is generated by the external electronic device.

11. The server of claim 9, wherein the instructions cause the server to receive updated data encrypted by the shared encryption key in response to generation of an update according to a change in at least one of the ID and the password for the at least one service, and
transmit the encrypted updated data to the external electronic device.

12. A method of sharing an ID and a password by an electronic device, the method comprising:
acquire a shared encryption key from a server, wherein the shared encryption key is generated by a previously registered external electronic device;
receiving, by input circuitry, a selection of at least one service to be shared with the external electronic device;
encrypting data including a user identification (ID) and a password associated with the at least one service in response to the selection, using the shared encryption key;
transmitting a request for sharing the encrypted data to a server through a communication circuitry to allow the external electronic device to use the at least one service without exposure of the ID and the password;
receiving a response to the transmitted request from the server through the communication circuitry; and
generating a notification indicating whether the ID and the password are successfully shared for the selected at least one service, based on the received response.

13. The method of claim 12, further comprising: acquiring a shared encryption key used for encrypting and/or decrypting the ID and the password for the at least one service.

14. The method of claim 12, further comprising:
generating update data based on detecting a change in at least one of the ID and the password for the at least one service; and
encrypting the update data via a shared encryption key and transmitting the encrypted update data to the external electronic device through the server.

15. The method of claim 12, further comprising registering the external electronic device as a sharing target further includes:
authenticating a user of the electronic device, and authenticating a user of the external electronic device based on a predetermined authentication scheme.

* * * * *